(12) United States Patent
Wada et al.

(10) Patent No.: US 9,619,139 B2
(45) Date of Patent: Apr. 11, 2017

(54) DEVICE, METHOD, AND STORAGE MEDIUM STORING PROGRAM

(71) Applicant: KYOCERA CORPORATION, Kyoto-shi, Kyoto (JP)

(72) Inventors: Yuuki Wada, Yokohama (JP); Katsuaki Oonishi, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 193 days.

(21) Appl. No.: 13/633,934

(22) Filed: Oct. 3, 2012

(65) Prior Publication Data
US 2013/0082965 A1 Apr. 4, 2013

(30) Foreign Application Priority Data

Oct. 3, 2011 (JP) .................................. 2011-219531
Oct. 3, 2012 (JP) .................................. 2012-221208

(51) Int. Cl.
| | |
|---|---|
| *G06F 3/041* | (2006.01) |
| *G06F 3/0488* | (2013.01) |
| *H04M 1/725* | (2006.01) |
| *H04M 1/66* | (2006.01) |

(52) U.S. Cl.
CPC .... *G06F 3/04883* (2013.01); *H04M 1/72544* (2013.01); *H04M 1/66* (2013.01); *H04M 1/72519* (2013.01); *H04M 2250/22* (2013.01)

(58) Field of Classification Search
CPC . G06F 3/04883; H04M 1/66; H04M 1/72519; H04M 1/72544; H04M 2250/22
USPC .................................................. 345/170–174
See application file for complete search history.

(56) References Cited

U.S. PATENT DOCUMENTS

| | | | |
|---|---|---|---|
| 2008/0165160 A1 | 7/2008 | Kocienda et al. | |
| 2009/0307631 A1* | 12/2009 | Kim et al. ..................... | 715/830 |
| 2010/0001967 A1* | 1/2010 | Yoo ............................... | 345/173 |
| 2010/0269040 A1* | 10/2010 | Lee ............................... | 715/702 |
| 2010/0299638 A1* | 11/2010 | Choi ............................. | 715/835 |
| 2011/0016390 A1* | 1/2011 | Oh et al. ....................... | 715/702 |
| 2012/0046077 A1* | 2/2012 | Kim ................... | H04M 1/72577 455/566 |
| 2012/0069231 A1* | 3/2012 | Chao ........................ | 348/333.01 |

FOREIGN PATENT DOCUMENTS

WO      2008086302 A1      7/2008

* cited by examiner

*Primary Examiner* — Tony Davis
(74) *Attorney, Agent, or Firm* — Hauptman Ham, LLP

(57) ABSTRACT

According to an aspect, a device includes a touch screen display and a controller. The touch screen display displays a lock screen including a first icon and a second icon. The controller displays a sub icon associated with the second icon on the lock screen when a gesture in which the first icon and the second icon are superimposed is detected.

8 Claims, 23 Drawing Sheets

DEVICE, METHOD, AND STORAGE MEDIUM STORING PROGRAM

CROSS-REFERENCE TO RELATED APPLICATIONS

This application claims priority from Japanese Application No. 2011-219531, filed on Oct. 3, 2011, and Japanese Application No. 2012-221208, filed on Oct. 3, 2012, the contents of which are incorporated by reference herein in their entireties.

BACKGROUND

1. Technical Field

The present application relates to a device, a method, and a storage medium storing therein a program. More particularly, the present application relates to a device including a touch screen display, a method of controlling the device, and a storage medium storing therein a program for controlling the device.

2. Description of the Related Art

A touch screen device having a touch screen display has been known. Examples of the touch screen devices include, but are not limited to, a smartphone and a tablet. The touch screen device detects a gesture of a finger, a pen, or a stylus pen through the touch screen display. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Many of touch screen devices have a lock function so as to prevent erroneous operations or the like. The touch screen device executes a lock function to display a lock screen on the touch screen display during a locked state. On the lock screen, operations other than a set operation are invalidated. Therefore, the touch screen device can prevent erroneous operations during the locked state by executing the lock function.

The touch screen device unlocks the locked state when an unlock operation is detected in the locked state. Therefore, when a user executes a desired application in the locked state, the user is required to input the unlock operation, select the application, and execute the selected application. Furthermore, when particular processing executable in the desired application is executed, the user is required to perform the unlock operation, select the desired application, and select particular processing from a menu or the like of the application. For example, in a case where the application is a mail application, the particular processing includes incoming mail check processing, new mail composition processing, outgoing mail check processing, and the like. As described above, the above-mentioned touch screen device has low operability and convenience in the locked state.

For the foregoing reasons, there is a need for a device, a method, and a program that provide the user with high operability and convenience in the locked state.

SUMMARY

According to an aspect, a device includes a touch screen display and a controller. The touch screen display displays a lock screen including a first icon and a second icon. The controller displays a sub icon associated with the second icon on the lock screen when a gesture in which the first icon and the second icon are superimposed is detected.

According to another aspect, a method is for controlling a device having a touch screen display. The method includes: displaying a lock screen, including a first icon and a second icon, on the touch screen display; and displaying a sub icon associated with the second icon when a gesture in which the first icon and the second icon are superimposed is detected.

According to another aspect, a non-transitory storage medium stores therein a program. When executed by a device having a touch screen display, the program cases the device to execute: displaying a lock screen, including a first icon and a second icon, on the touch screen display; and displaying a sub icon associated with the second icon when a gesture in which the first icon and the second icon are superimposed is detected.

DETAILED DESCRIPTION

Exemplary embodiments of the present invention will be explained in detail below with reference to the accompanying drawings. A smartphone will be explained below as an example of a device provided with a touch screen display.

Figure 1:
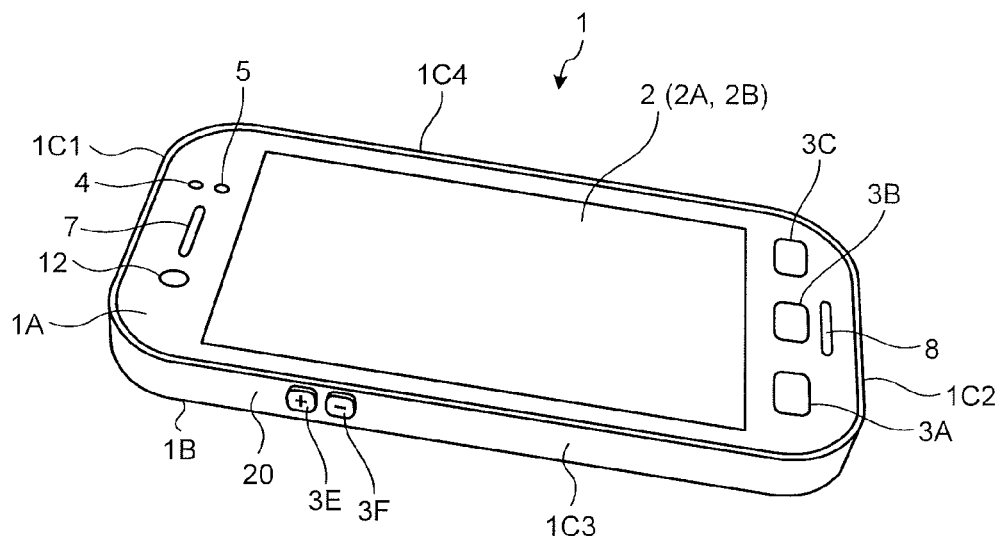
FIG. 1 is a perspective view of a smartphone according to an embodiment.
Figure 2:
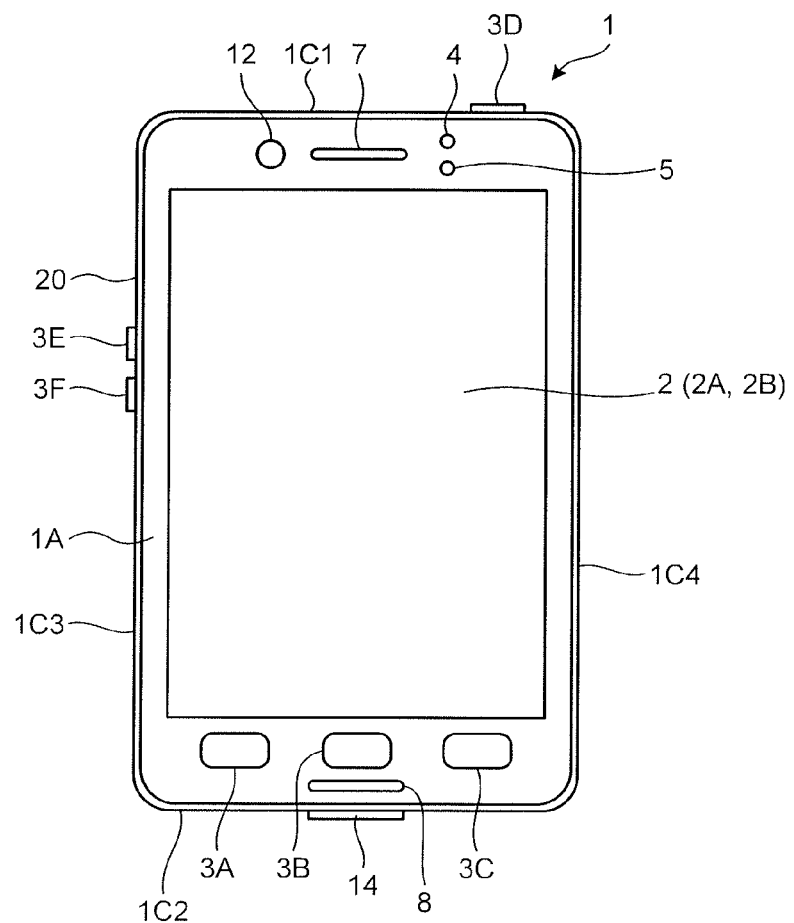
FIG. 2 is a front view of the smartphone.
Figure 3:
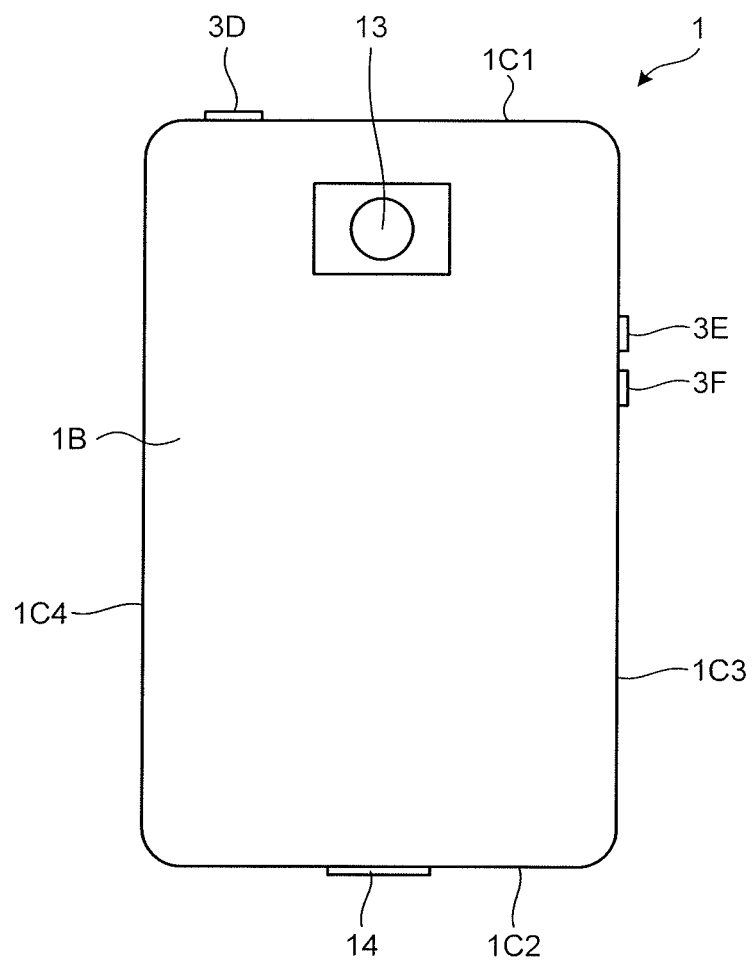
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a camera 13, which is provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electroluminescence display (GELD), or an inorganic electroluminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the description herein below, a finger, pen, stylus pen, and the like may be referred to as a "contact object" or an "object".

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi touch gesture". Examples of the multi touch gesture include a pinch in and a pinch out. A tap, a flick, a swipe, and the like are a single touch gesture when performed by using a finger, and are a multi touch gesture when performed by using a plurality of fingers.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X" or "the controller detects X".

Figure 4:
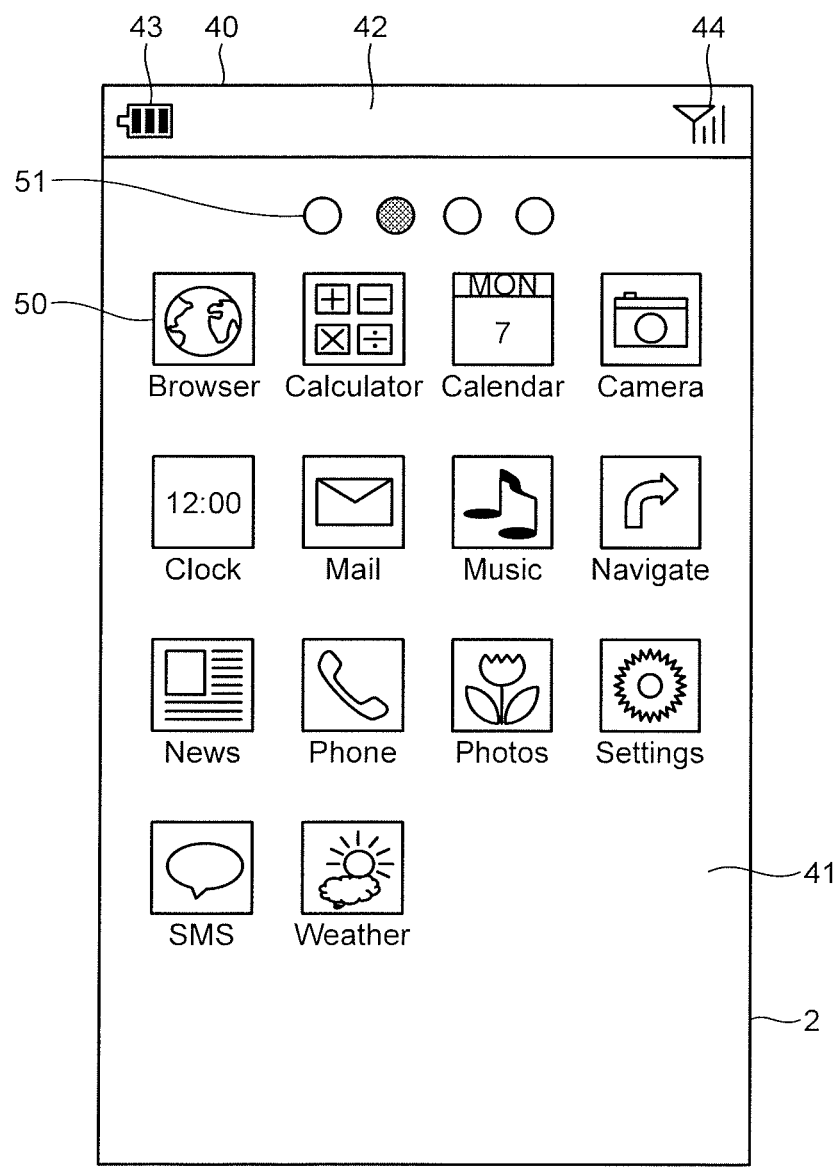
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A in a different manner from that of the home screen.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
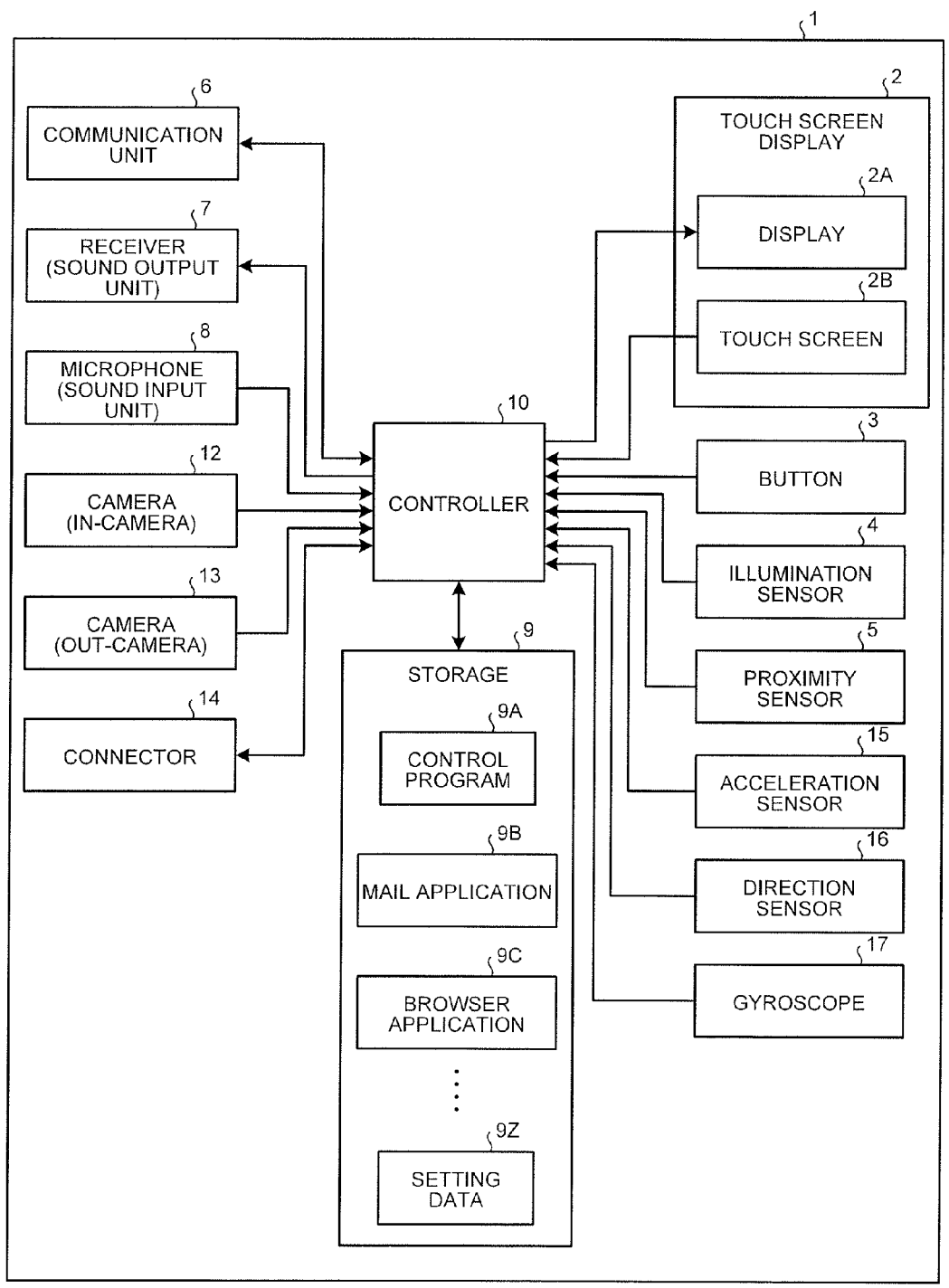
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed for the smartphone 1. Specifically, the controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 is a sound output unit. The receiver 7 outputs a sound signal transmitted from the controller 10 as sound. The receiver 7 is used, for example, to output voice of the other party on the phone. The microphone 8 is a sound input unit. The microphone 8 converts speech of the user or the like to a sound signal and transmit the converted signal to the controller 10. The smartphone 1 may be provided with a speaker instead of, or in addition to, the receiver 7.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

The programs stored in the storage 9 include applications executed in the foreground or in the background and a control program for assisting operations of the applications. The application causes, for example, a predetermined screen to be displayed on the display 2A, and the controller to perform a process according to a gesture detected through the touch screen 2B. The control program is, for example, an OS. The application and the control program may be installed in the storage 9 through communication by the communication unit 6 or through a non-transitory storage medium.

The storage 9 stores therein, for example, a control program 9A, a mail application 9B, a browser application 9C, and setting data 9Z. The mail application 9B provides an e-mail function for composing, transmitting, receiving, and displaying e-mail, and the like. The browser application 9C provides a WEB browsing function for displaying WEB pages. The setting data 9Z contains information related to various settings on the operations of a smartphone 1.

The control program 9A provides a function related to various controls for operating the smartphone 1. The control program 9A controls, for example, the communication unit 6, the receiver 7, and the microphone 8 to make a phone call. The function provided by the control program 9A includes functions for performing various controls such as changing a screen displayed on the display 2A according to gestures detected through the touch screen 2B while the locked state is set. The functions provided by the control program 9A can be used in combination with a function provided by the other program such as the mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, and the receiver 7. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to perform various controls, such as a control for changing information displayed on the display 2A in accordance with the gesture detected through the touch screen 2B.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

An example of the controls based on the functions provided by the control program 9A will be described with reference to FIGS. 6 to 22. The function provided by the control program 9A includes a function for changing the screen displayed on the display 2A according to gestures detected through the touch screen 2B while the locked state is set. Hereinafter, an example of a control performed according to user instructions while the locked state is set will be described.

Figure 6:
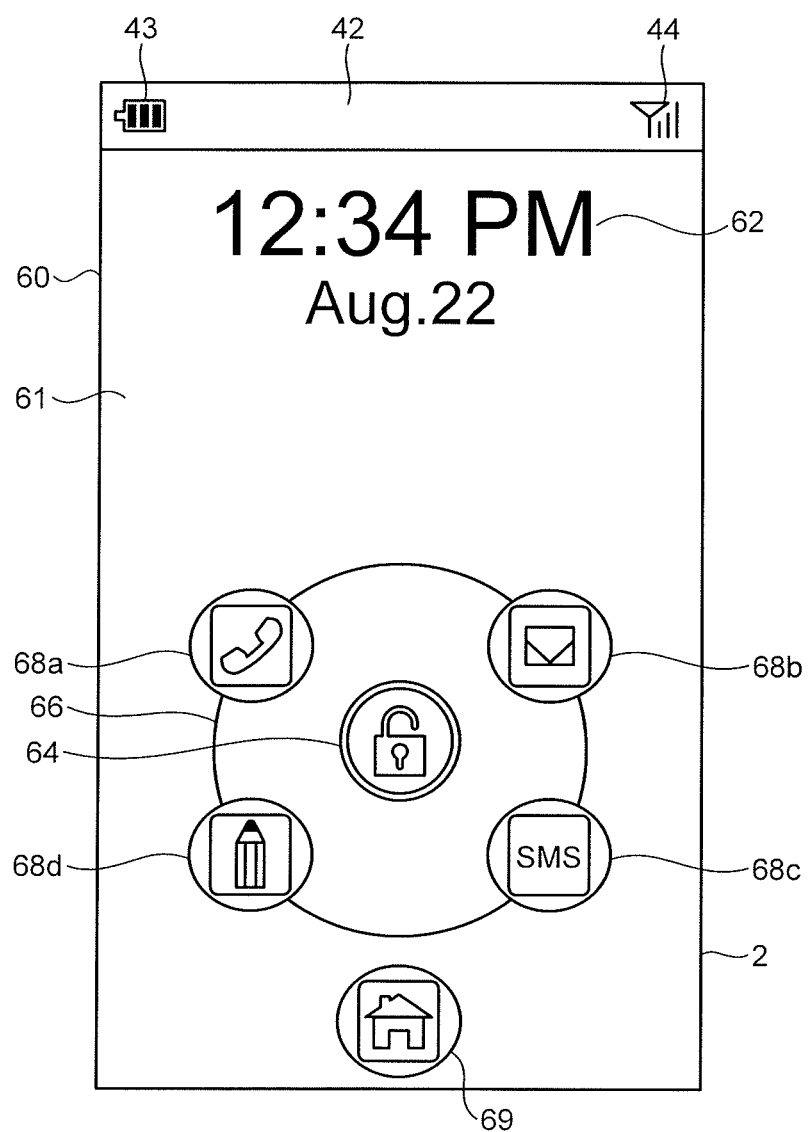
FIG. 6 is a diagram illustrating an example of a lock screen.

An example of the lock screen will be described with reference to FIG. 6. The lock screen is displayed on the display 2A while the locked state is set, that is, while the setting of the locked state is ON. FIG. 6 illustrates an example of the lock screen. A lock screen 60 is a screen representing that the locked state is set. The lock screen 60 is a screen that moves to other screen when a preset unlock gesture is detected. The lock screen 60 is a screen on which gestures other than a preset gesture are invalidated. The smartphone 1 is in a state that cannot perform various operations until a particular gesture is detected on the lock screen.

The lock screen 60 illustrated in FIG. 6 has a date/time image 62, a key icon (first icon) 64, a ring 66, and application icons (second icons) 68a, 68b, 68c and 68d, and a home icon 69 arranged on a wall paper 61. On the lock screen 60, the same area 42 as the area 42 of the home screen 40 is arranged at the top edge of the display 2A. Displayed on the area 42 of the lock screen 60 are a remaining mark 43 indicating a remaining amount of a power supply and a radio-wave level mark 44 indicating electric field strength of radio wave for communication. The wall paper 61 is displayed behind the date/time image 62, the key icon 64, the ring 66, the application icons 68a, 68b, 68c and 68d, and the home icon 69.

The date/time image 62 is an image that indicates time and date, and is displayed under the area 42 in the upper portion of the lock screen 60. In the date/time image 62 illustrated in FIG. 6, a state display indicating the time is "12:34 PM" that indicates twelve o'clock thirty four minutes in the afternoon, and a state display indicating the date is "Aug. 22" that indicates August 22.

The key icon 64 is a lock-shaped image and is displayed in a substantially central portion of the screen. In the embodiment, the key icon 64 is an object that a user drags through an unlock gesture and a gesture for executing each application. When a swipe starting from the key icon 64 is detected, the smartphone 1 moves a display position of the key icon 64 according to a movement of a contact position of the swipe.

The outer periphery of the ring 66 is displayed at a location surrounding the key icon 64. The ring 66 has a circular frame shape. The key icon 64 is arranged in a central portion of the circular frame of the ring 66. The circular frame of the ring 66 is arranged with the same center as that of the key icon 64 and has a shape with a larger diameter than that of the outer edge of the key icon 64. The circular frame of the ring 66 is arranged to be spaced apart from the outer edge of the key icon 64 by more than a predetermined distance. The ring 66 has a closed shape and becomes a boundary that divides the area of the lock screen 60 into two areas, that is, an inner area (a first area) and an outer area (a second area) of the ring 66.

The application icons 68a, 68b, 68c and 68d are displayed separately on the ring 66. The application icons 68a, 68b, 68c and 68d are arranged on the ring 66 in order of the application icons 68a, 68b, 68c and 68d in clockwise direction. Each of the application icons 68a, 68b, 68c and 68d is associated with a particular application installed in the smartphone 1. When detecting a particular gesture for the application icons 68a, 68b, 68c or 68d, the smartphone 1 executes the application associated with the application icon for which the particular gesture is performed. The particular gesture will be described below.

In the example illustrated in FIG. 6, the application icon 68a is associated with a phone application. The application icon 68b is associated with a mail application. The application icon 68c is associated with an SMS application. The application icon 68d is associated with a text editor application.

Each of the application icons 68a, 68b, 68c and 68d includes an image that represents the associated application. Each of the application icons 68a, 68b, 68c and 68d may contain an image and a character like the icon 50, and may contain a symbol or a graphic instead of an image. Each of the application icons 68a, 68b, 68c and 68d may contain only a character string, without containing an image.

The home icon 69 is displayed in an area that is a lower end side of the lock screen 60 in the outside of the ring 66. The home icon 69 is an icon that is associated with execution of unlock processing and processing of moving to the home screen 40. When detecting a particular gesture for the home icon 69, the smartphone 1 unlocks the locked state and displays the home screen 40 on the display 2A. The particular gesture will be described below.

Figure 7:
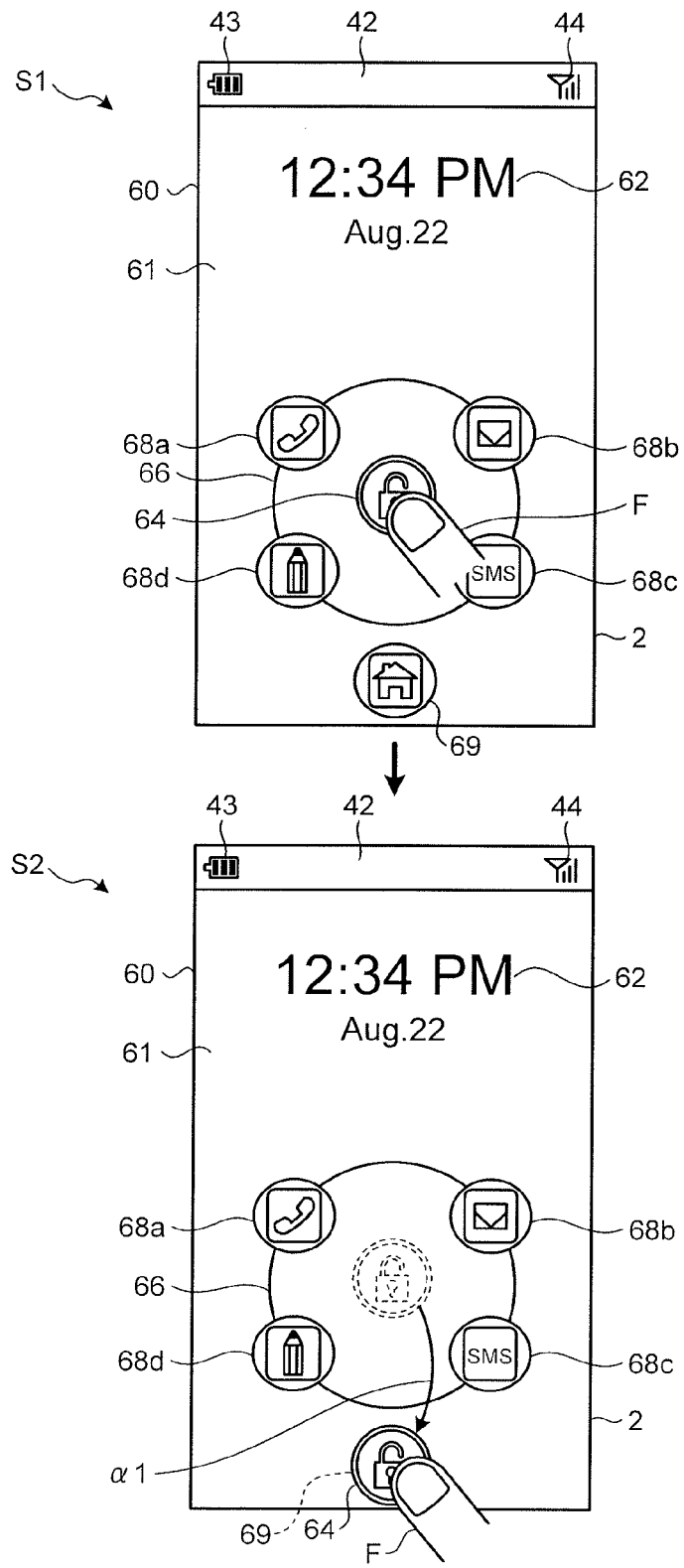
FIG. 7 is a diagram illustrating an example of a control during displaying the lock screen.

Then, the particular gesture for the home icon 69 will be described with reference to FIG. 7. At Step S1 illustrated in FIG. 7, the lock screen 60 is displayed on the display 2A. At Step S1, the user's finger F touches the key icon 64. In this case, the smartphone 1 detects a touch on a portion where the key icon 64 is arranged.

At Step S2, the user's finger F drops the key icon 64 on the home icon 69. That is, the user uses his/her finger F to touch the area where the key icon 64 is displayed at Step S1, drags the key icon 64 along a path indicated by an arrow α1, and releases the key icon 64 in the area where the home icon 69 is displayed. In this case, the smartphone 1 detects a swipe, of which the start point is the portion where the key icon 64 is arranged and the end point is the portion where the home icon 69 is arranged. That is, the smartphone 1 detects a drop of the key icon 64 on the home icon 69. When detecting such a drop, the smartphone 1 unlocks the locked state and displays the home screen 40 on the touch screen display 2. As described above, in the smartphone 1 of the embodiment, the drop of the key icon 64 on the home icon 69 is set as the particular gesture for the home icon 69.

When detecting the swipe of which the start point is the key icon 64, the smartphone 1 may display the key icon 64 at the position where the contact is detected by the swipe. That is, when detecting the swipe of which the start point is the key icon 64, the smartphone 1 may display the key icon 64 during the swipe while moving according to the movement of the finger F.

When detecting a gesture of dropping the key icon 64 on the outer area (the second area) of the ring 66, the smartphone 1 also unlocks the locked state and displays the home screen 40 on the display 2A. That is, by dropping key icon 64 on the second area, the user can unlock the locked state and allow the home screen 40 to be displayed.

When detecting a gesture of dropping the key icon 64 on the inner area (the first area) of the ring 66, the smartphone 1 returns the key icon 64 to the initial position. That is, when the key icon 64 is not dropped on either of the second area and the application icons 68a, 68b, 68c and 68d, the smartphone 1 displays the key icon 64 at the central position of the ring 66.

Figure 8:
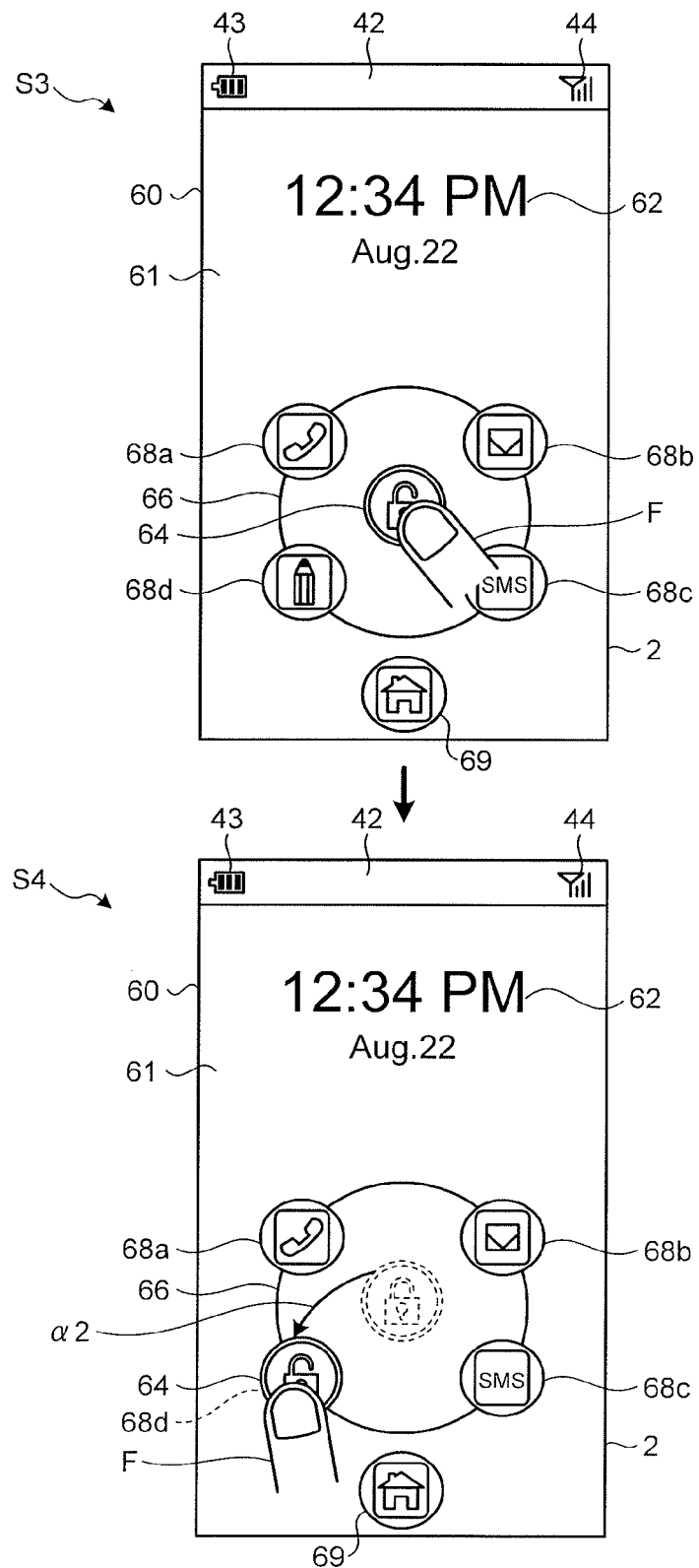
FIG. 8 is a diagram illustrating an example of a control during displaying the lock screen.

Then, the particular gesture for the application icons 68a, 68b, 68c and 68d will be described with reference to FIG. 8. FIG. 8 describes a case where the particular gesture is performed with respect to the application icon 68d so as to execute an application desired by a user. At Step S3 illustrated in FIG. 8, the lock screen 60 is displayed on the display 2A. At Step S3, the user's finger F touches the key icon 64. In this case, the smartphone 1 detects a touch on a portion where the key icon 64 is arranged.

At Step S4, the user's finger F drops the key icon 64 on the application icon 68d. That is, at Step S4, the user uses his/her finger F to touch the area where the key icon 64 is displayed, drags the key icon 64 along a path indicated by an arrow α2, and releases the key icon 64 in the area where the application icon 68d is displayed. In this case, the smartphone 1 detects the swipe, of which the start point is the portion where the key icon 64 is arranged and the end point is the portion where the application icon 68d is arranged. That is, the smartphone 1 detects the drop of the key icon 64 on the application icon 68d. When detecting such a drop, the smartphone 1 unlocks the locked state and executes the text editor application as the application associated with the application icon 68d. Subsequently, the smartphone 1 displays an operation screen, which is displayed in a case the text editor application is executed as the application associated with the application icon 68d, on the touch screen display 2.

Figure 9:
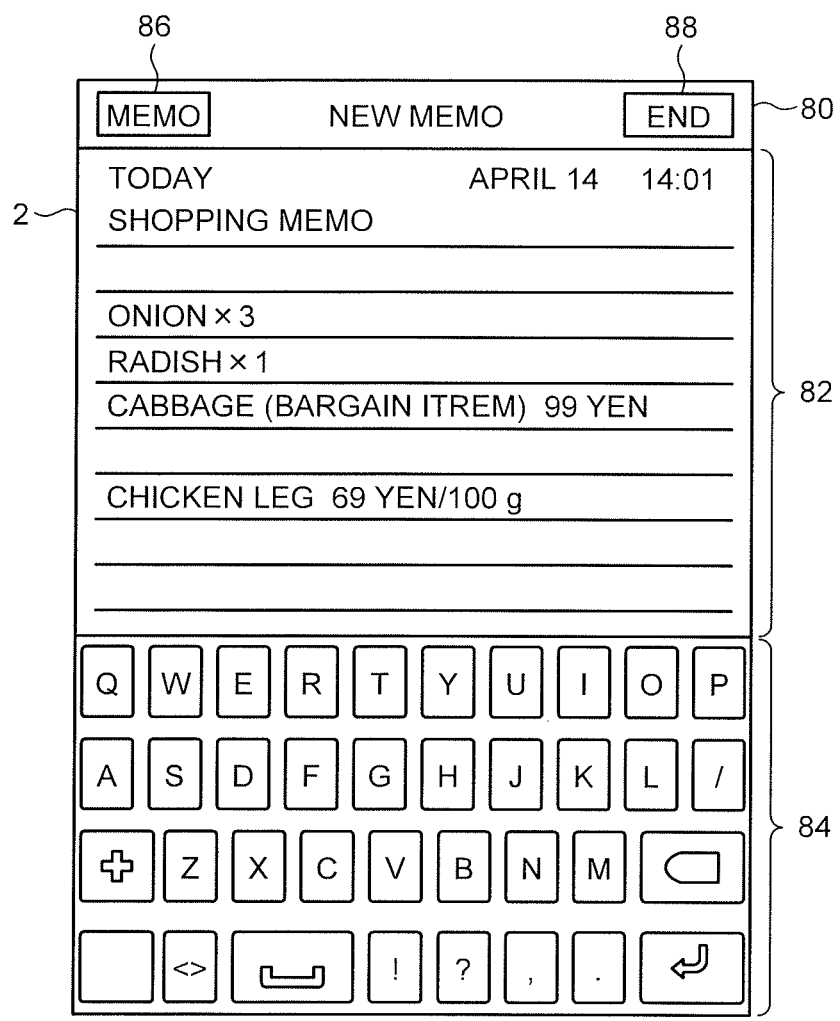
FIG. 9 is a diagram illustrating an example of an operation screen in a case where a text editor application is executed.

FIG. 9 illustrates an example of the operation screen in case the text editor application is executed. When the text editor application is executed, the smartphone 1 displays an operation screen 80 illustrated in FIG. 9 on the touch screen display 2. The operation screen 80 illustrated in FIG. 9 includes a display area 82 for checking an input character string on a substantially entire area of the upper portion of the screen, a keyboard object 84 for executing the input of a character string on the lower portion of the screen, a memo list display button 86 for displaying a memo list registered by the text editor on the upper left side of the display area 82, and a end button 88 for ending the processing of the text editor on the upper right side of the display area 82. In such a state that the operation screen 80 is displayed, when detecting a tap or a swipe with respect to the keyboard object 84, the smartphone 1 detects a character corresponding to a tapped area or a swiped trajectory as an input character. The smartphone 1 displays the input character at a set position of the display area 82. In such a state that the operation screen 80 is displayed, when detecting a tap with respect to the memo list display button 86 or the completion button 88, the smartphone 1 executes the processing associated with the tapped button. In this manner, the smartphone 1 executes a variety of processing of the text editor application and detects the input of the text.

As described above, the smartphone 1 of the embodiment sets the drop of the key icon 64 on the application icons 68a, 68b, 68c or 68d as the particular gesture for executing the application associated with the application icon on which the key icon 64 is dropped. Although the smartphone 1 of the embodiment sets the drop of the key icon 64 on the application icon, that is, the gesture of dropping the key icon 64 on the application icon, as the particular gesture for the application icon; however, the particular gesture is not limited thereto. For example, a gesture of flicking the key icon 64 toward the application icon may be set as the particular gesture for the application icon. In a case where it is set to move the key icon 64 to a next tapped position after the key icon 64 is tapped, a gesture of tapping an application icon after tapping the key icon 64 may be set as the particular gesture for the application icon. As described above, the particular gesture for the application icon may be a gesture of releasing the key icon 64 in such a state that the key icon 64 and the application icon are superimposed. The above-described gestures correspond to the gesture of releasing the key icon 64 in such a state that the key icon 64 and the application icon are superimposed.

In the embodiment, although the gesture in which the touch on the key icon is the start point have been described, a gesture in which the touch on the application icon is the start point may be set as the particular gesture for executing the application associated with the application icon. For example, a gesture of dragging the application icon and dropping the application icon on the key icon may be set as the particular gesture for the application icon.

Figure 10:
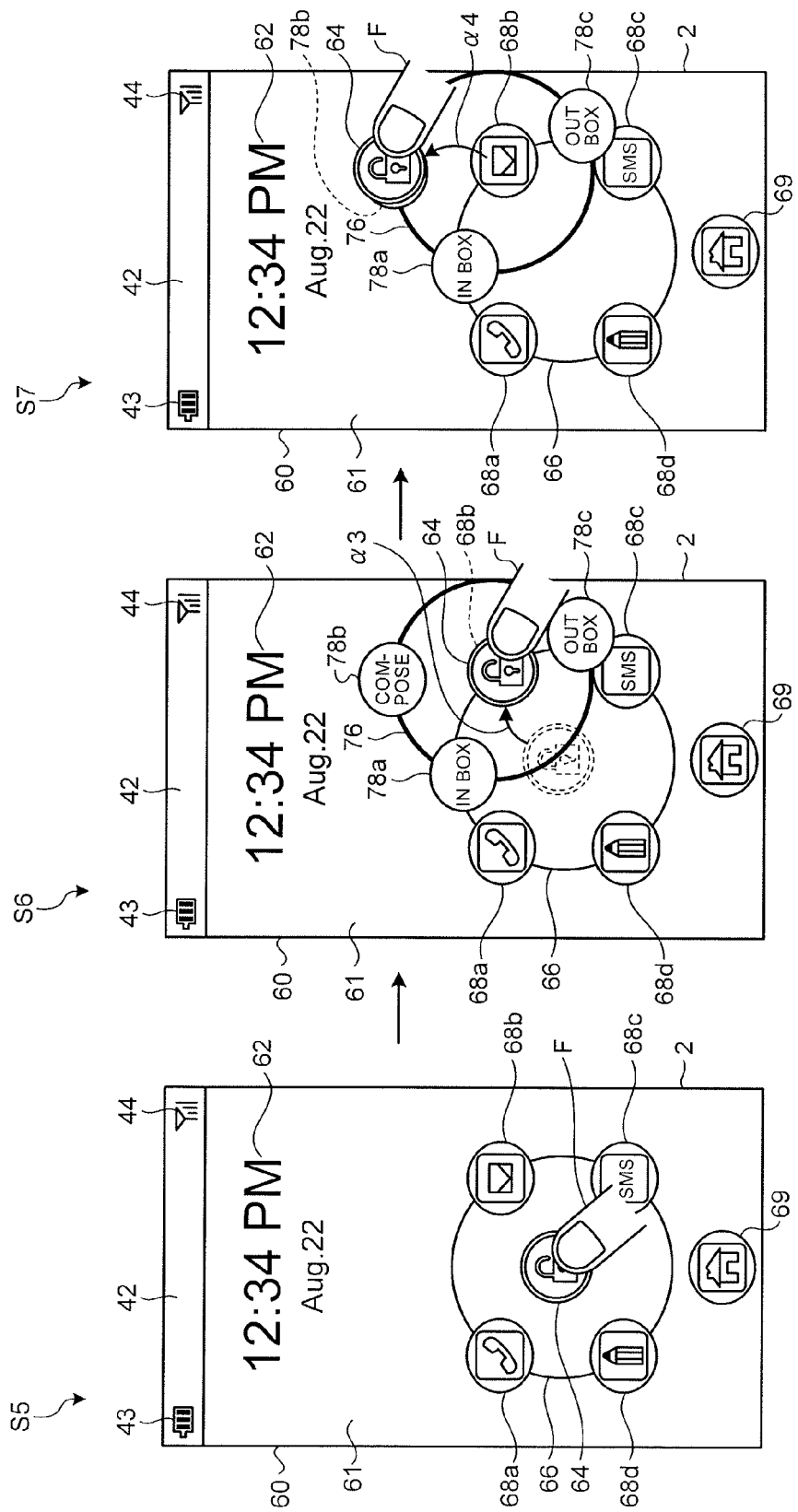
FIG. 10 is a diagram illustrating an example of a control during displaying the lock screen.

Then, another example of particular gesture for application icon will be described with reference to FIG. 10. FIG. 10 describes a particular gesture for executing particular processing that is executable in an application desired by a user. At Step S5 illustrated in FIG. 10, the lock screen 60 is displayed on the display 2A. At Step S5, the user's finger F touches the key icon 64. In this case, the smartphone 1 detects the touch in the portion where the key icon 64 is arranged.

At Step S6, the user's finger F moves the key icon 64 onto the application icon 68b. That is, the finger F touches the area where the key icon 64 is displayed at Step S5, and drags the key icon 64 along a path indicated by an arrow α3, so that the key icon 64 is moved to the area where the application icon 68*b* is displayed. In this case, the smartphone 1 detects the swipe, of which the start point is the portion where the key icon 64 is arranged and which moves to the portion where the application icon 68*b* is arranged. That is, the smartphone 1 detects the gesture of superimposing the key icon 64 on the application icon 68*b*. When detecting the gesture of superimposing the key icon 64 on the application icon 68*b* as the particular gesture for the application icon 68*b*, the smartphone 1 displays sub icons 78*a*, 78*b* and 78*c* associated with the application icon 68*b*.

On the lock screen 60 displayed at Step S6 of FIG. 10, the date/time image 62 on the wall paper 61, the key icon (first icon) 64, the ring 66, the application icons (second icons) 68*a*, 68*b*, 68*c* and 68*d*, the home icon 69, the sub ring 76, and the sub icons 78*a*, 78*b* and 78*c* associated with the application icon 68*b* are arranged.

The sub ring 76 is displayed at a location surrounding the outer periphery of the application icon 68*b*. The sub ring 76 has a circular frame shape. The application icon 68*b* is arranged in the central portion of the circular frame of the sub ring 76. The circular frame of the sub ring 76 is arranged with the same center as that of the application icon 68*b* and has a shape with a larger diameter than that of the outer edge of the application icon 68*b*. The circular frame of the sub ring 76 is arranged apart from the outer edge of the application icon 68*b* by more than a predetermined distance. The sub ring 76 has a closed shape and becomes a boundary that divides the area of the lock screen 60 into two areas, that is, the inner area and the outer area of the sub ring 76.

The sub icons 78*a*, 78*b* and 78*c* are displayed separately on the sub ring 76. The sub icons 78*a*, 78*b* and 78*c* are arranged on the sub ring 76 in order of the sub icons 78*a*, 78*b* and 78*c* in clockwise direction. Each of the sub icons 78*a*, 78*b* and 78*c* is associated with particular processing that is executable in the application associated with the application icon 68*b*. When detecting a particular gesture for the sub icons 78*a*, 78*b* or 78*c*, the smartphone 1 executes the particular processing associated with the sub icon for which the particular gesture is performed. The particular gesture will be described below.

In the example illustrated in FIG. 10, since the application icon 68*b* is associated with the mail application, the sub icon 78*a* is associated with incoming mail check processing that is executable in the mail application. In a similar manner, the sub icon 78*b* is associated with new mail composition processing that is executable in the mail application. The sub icon 78*c* is associated with outgoing mail check processing that is executable in the mail application.

Each of the sub icons 78*a*, 78*b* and 78*c* includes an image that represents the associated particular processing. Each of the sub icons 78*a*, 78*b* and 78*c* may contain an image or a character, or may contain a symbol or a graphic instead of an image. Each of the sub icons 78*a*, 78*b* and 78*c* may contain only a character string, without containing an image. For example, in the example illustrated in FIG. 10, the sub icon 78*a* contains a character string of "IN BOX" representing that the sub icon 78*a* is associated with the incoming mail check processing. The sub icon 78*b* contains a character string of "COMPOSE" representing that the sub icon 78*b* is associated with the new mail composition processing. The sub icon 78*c* contains a character string of "OUT BOX" representing that the sub icon 78*c* is associated with the outgoing mail check processing.

At Step S7, the user's finger F moves the key icon 64 onto the sub icon 78*b*. That is, the user swipes his/her finger F, which touches the area where the application icon 68*b* is displayed at Step S6, along a path indicated by an arrow α4, and moves the finger F to the area where the sub icon 78*b* is displayed. In this case, the smartphone 1 detects a swipe, which adds the portion where the application icon 68*b* detected at Step S6 is arranged, as a swipe, of which an end point is the portion where the sub icon 78*b* is arranged. That is, the smartphone 1 detects the gesture of releasing the key icon 64 superimposed on the sub icon 78*b*. When detecting the gesture of releasing the key icon 64 superimposed on the sub icon 78*b* as the particular gesture for the sub icon 78*b*, the smartphone 1 executes the particular processing associated with the sub icon 78*b*, that is, the new mail composition processing. That is, when detecting the gesture of superimposing the key icon 64 on the sub icon 78*b*, the smartphone 1 displays the new mail composition screen of the mail application.

In the embodiment, as an example of the application icon associated with the sub icon, the processing of displaying the sub icons 78*a*, 78*b* and 78*c* in the example of the application icon 68*b* associated with the mail application has been described; however, the application icon associated with the sub icon is not limited thereto. For example, when detecting the particular gesture for the application icon 68*a* associated with the phone application, the smartphone 1 may display the sub icons associated with the application icon 68*a*. Examples of the sub icons associated with the phone may include, but are not limited to, sub icons that are short-cuts of missed call check processing, new call start processing, and outgoing call history check processing. When detecting the particular gesture for the application icon 68*c* associated with the SMS application, the smartphone 1 may display the sub icons associated with the application icon 68*c*, as in the case of the mail application. Examples of the sub icons associated with the mail may include, but are not limited to, sub icons that are short-cuts of incoming mail check processing, new mail composition processing, and outgoing mail check processing.

In the embodiment, it has been described about the control of the smartphone 1 to display the sub icons 78*a*, 78*b* and 78*c* when detecting the gesture of superimposing the key icon 64 on the application icon 68*b*, and execute the particular processing associated with the sub icon 78*b*. However, in case the user drops the key icon 64 on the application icon 68*b* at Step S6 of FIG. 10, the smartphone 1 can execute the mail application associated with the application icon 68*b*. When detecting the gesture of moving the key icon 64 to the outer area of the sub ring 76, the smartphone 1 may delete the displayed sub icons 78*a*, 78*b* and 78*c*. After displaying the sub icons 78*a*, 78*b* and 78*c* associated with the application icon 68*b*, when detecting the gesture of superimposing the key icon 64 on other application icons 68*a*, 68*c* or 68*d*, the smartphone 1 may delete the displayed sub icons 78*a*, 78*b* and 78*c*. When detecting the gesture of dropping the key icon 64 on the inner area of the sub ring 76, the smartphone 1 may execute the application associated with the application icon 68*b* located at the center of the sub ring 76. That is, when the key icon 64 is not dropped on either of the first area, the second area, and the sub icons 78*a*, 78*b* and 78*c* after displaying the sub icons, the smartphone 1 may execute the application associated with the application icon 68*b* located at the center of the sub ring 76.

In the embodiment, although the gesture in which the touch on the key icon is the start point have been described, a gesture in which the touch on the sub icon is the start point may be set as the particular gesture for executing the particular processing associated with the sub icon. For example, the gesture of dragging the sub icon and dropping the sub icon on the key icon may be set as the particular gesture for the sub icon.

Figure 11:
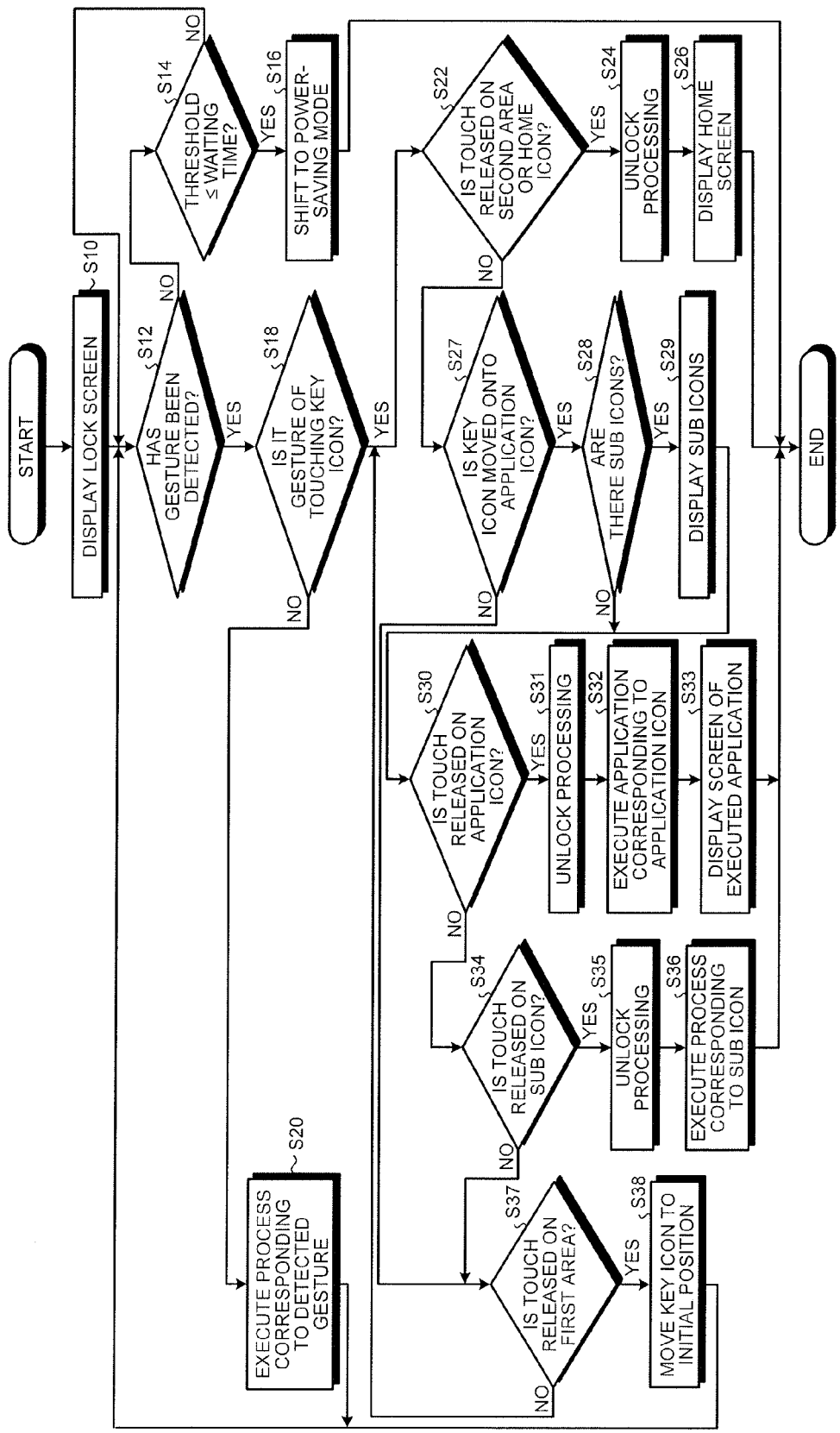
FIG. 11 is a flowchart illustrating a procedure of a control that is performed in a locked state.

An example of the procedure of the control based on the functions provided by the control program 9A will be described with reference to FIG. 11. FIG. 11 illustrates the procedure of the control that is performed in the locked state, in particular, the control that is performed during displaying the lock screen. The procedure illustrated in FIG. 11 is realized by the controller 10 executing the control program 9A. The procedure illustrated in FIG. 11 is executed in a case where the locked state is set and an operation of displaying a screen on the display 2A is detected. The case where the operation of displaying the screen on the display 2A is detected is, for example, a case where a screen return operation is detected in such a state that a power-saving mode is set so that the screen is not displayed on the touch screen display 2. The controller 10 may execute another procedure for control related to the lock screen 60 in parallel with the procedure illustrated in FIG. 11.

The controller 10 displays the lock screen on the touch screen display 2 at Step S10. When the lock screen is displayed at Step S10, the controller 10 determines at Step S12 whether a gesture has been detected. The controller 10 obtains the detection result of the touch screen 2B, and determines whether a gesture is detected, based on the obtained detection result. When it is determined at Step S12 that no gesture has been detected (No at Step S12), the controller 10 determines at Step S14 whether threshold value time≤waiting time is satisfied. That is, the controller 10 determines whether the waiting time defined as the elapsed time after the completion of the latest operation is equal to or greater than the predetermined threshold value time.

When it is determined at Step S14 that threshold value time≤waiting time is not satisfied (No at Step S14), that is, when it is determined that threshold value time>waiting time is satisfied, the controller 10 proceeds to Step S12 and determines again whether there is a gesture. When it is determined at Step S14 that threshold value time≤waiting time is satisfied (Yes at Step S14), the controller 10 shifts to the power-saving mode at Step S16 and ends the processing. That is, the controller 10 changes to a state in which the lock screen is not displayed, by turning off the touch screen display 2, and ends the processing.

When it is determined at Step S12 that a gesture has been detected (Yes at Step S12), the controller 10 determines, at Step S18, whether the gesture is a gesture of touching the key icon. That is, the controller 10 determines whether the gesture detected at Step S12 is a gesture of touching the key icon. When it is determined at Step S18 that the detected gesture is not the gesture of touching the key icon (No at Step S18), the controller 10 executes the process corresponding to the detected gesture at Step S20, and proceeds to Step S12. Examples of the process corresponding to the detected gesture include, but are not limited to, processing of displaying the sub icons associated with the application icon, processing of moving the positions of the application icons displayed on the lock screen, etc. The processing of displaying the sub icons and the processing of moving the positions of the application icons will be described below. Furthermore, the process corresponding to the detected gesture may be processing of displaying screens displayable on the lock screen, for example, a help screen or an emergency notice screen.

When it is determined at Step S18 that the detected gesture is the gesture of touching the key icon (Yes at Step S18), the controller 10 determines at Step S22 whether the touch is released on the second area or the home icon. That is, the controller 10 determines whether the touch on the key icon, which is detected at Step S18, is swiped and released so that the corresponding released position (position where the key icon is dropped) is on the second area or on the home icon.

When it is determined at Step S22 that the key icon is released on the second area or on the home icon (Yes at Step S22), the controller 10 executes unlock processing at Step S24, and displays the home screen on the touch screen display 2 at Step S26. When the home screen is displayed at Step S26, the controller 10 ends the processing.

When it is determined at Step S22 that the key icon is not released on either of the second area and the home icon (No at Step S22), the controller 10 determines at Step S27 whether a gesture of moving the key icon onto the application icon is detected. That is, the controller 10 determines whether the touch on the key icon, which is detected at Step S18, is swiped and is on the application icon.

When it is determined at Step S27 that the gesture of moving the key icon onto the application icon is detected (Yes at Step S27), the controller 10 determines at Step S28 whether there are sub icons associated with the application icon. When it is determined at Step S27 that there is no gesture of moving the key icon onto the application icon (No at Step S27), the controller 10 proceeds to processing of Step S37.

When it is determined at Step S28 that there are the sub icons associated with the application icon (Yes at Step S28), the controller 10 displays the sub icons on the lock screen at Step S29. For example, as illustrated in FIG. 10, when detecting the particular gesture for the application icon 68b (in FIG. 10, the gesture of moving the key icon 64 onto the application icon 68b), the controller 10 displays the sub icons 78a, 78b and 78c on the lock screen 60. Subsequently, the controller 10 proceeds to processing of Step S30. When it is determined at Step S28 that there are no sub icons associated with the application icon (No at Step S28), the controller 10 proceeds to the processing of Step S30.

When it is determined at Step S28 that there are no sub icons associated with the application icon (No at Step S28), or when the sub icons are displayed at Step S29, the controller 10 determines at Step S30 whether the touch is released on the application icon. That is, the controller 10 determines whether the touch on the key icon, which is detected at Step S18, is swiped and then released so that the corresponding released position (position where the key icon is dropped) is on the application icon.

When it is determined at Step S30 that the key icon is released on the application icon (Yes at Step S30), the controller 10 executes unlock processing at Step S31, executes the application corresponding to the application icon located at the dropped position at Step S32, and displays the screen of the executed application on the touch screen display 2 at Step S33. For example, as illustrated in FIGS. 8 and 9, when detecting the release of the key icon 64 superimposed on the application icon 68d, the controller 10 executes the text editor application associated with the application icon 68d. When the moved screen of the application is displayed at Step S33, the controller 10 ends the processing.

When it is determined at Step S30 that the key icon is not released on the application icon (No at Step S30), the controller 10 determines at Step S34 whether the key icon is released on the sub icon. That is, the controller 10 determines whether the touch on the key icon, which is detected at Step S18, is swiped and then released so that the corresponding released position (position where the key icon is dropped) is on the sub icon.

When it is determined at Step S34 that the key icon is released on the sub icon (Yes at Step S34), the controller 10 executes unlock processing at Step S35, and executes particular processing corresponding to the sub icon located at the dropped position at Step S36. That is, the controller 10 displays the operation screen for executing the particular processing corresponding to the sub icon. For example, as illustrated at Step S7 of FIG. 10, when detecting the release of the key icon 64 superimposed on the sub icon 78b, the controller 10 executes the new mail composition processing associated with the sub icon 78b. That is, the controller 10 displays the new mail composition screen for executing the new mail composition processing associated with the sub icon 78b. When the moved operation screen for executing the particular processing of the application is displayed at Step S36, the controller 10 ends the processing.

When it is determined at Step S27 that there is no gesture of moving the key icon onto the application icon (No at Step S27), or when it is determined at Step S34 that the key icon is not released on the sub icon (No at Step S34), the controller 10 determines at Step S37 whether the key icon is released in the first area. That is, the controller 10 determines whether the touch on the key icon, which is detected at Step S18, is swiped and then released so that the corresponding released position (position where the key icon is dropped) is the first area.

When it is determined at Step S37 that the key icon is released in the first area (Yes at Step S37), the controller 10 moves the key icon to the initial position at Step S38, and proceeds to Step S12. In case the sub icon is displayed at Step S29, the controller 10 deletes the sub icon. When it is determined at Step S37 that the key icon is not released in the first area (No at Step S37), the controller 10 proceeds to Step S22. As described above, when detecting the touch on the key icon at Step S18, the controller 10 repeats the processing of Step S22, Step S27, Step S30, Step S34, and Step S37 until the release of the touch gesture, that is, the drop of the key icon, is detected at Step S22, Step S30, or Step S34.

As described above, in a case where there are the sub icons associated with the application icon displayed on the lock screen, the smartphone 1 displays the sub icons when the particular gesture for the application icon (gesture of superimposing the key icon on the application icon in the embodiment) is detected. Therefore, according to the smartphone 1 of the embodiment, in the case of executing the particular processing that is executable in the desired application, the user does not need to perform three-stage operations, that is, the execution of the unlock processing, the selection of the desired application, and the selection of the particular processing from the application menu, or the like. That is, by just making the gesture of superimposing the key icon on the application icon on the lock screen, the user can display the operation screen for executing the particular processing of the desired application. For example, in a case where the application is the mail application, the user can smoothly select and execute, on the lock screen, the desired processing from among the incoming mail check processing, the new mail composition processing, the outgoing mail check processing, and the like, which can be executed in the mail application. As described above, the smartphone 1 of the embodiment provides the user with high operability and high convenience in a state that the lock screen representing the locked state is displayed.

When detecting the drop of the key icon on the application icon, the smartphone 1 executes the application associated with the application icon. Therefore, the user can execute the desired application quickly from the locked state. When detecting the release gesture in the state that the application icon and the key icon are superimposed, the smartphone 1 executes the unlock processing, the application selection processing, and the application execution processing. Thus, the application icons displayed on the lock screen works as icons having a short-cut function. Therefore, the user can input three processings through a single gesture. Therefore, the user can execute the desired application by a short-cut operation in which part of operations, for example, an operation of performing the unlock and displaying the icon selection screen and the operation of selecting the icon on the icon selection screen are omitted.

By arranging the application icon at a position spaced apart from the key icon, specifically on the ring 66, the smartphone 1 can suppress the application associated with the application icon from being executed at unintended timings due to erroneous operations, even when the application icon is arranged on the lock screen.

When detecting the drop of the key icon on the second area or the home icon, the smartphone 1 unlocks the locked state and displays the home screen. Therefore, the user can unlock the locked state through a simple operation. The smartphone 1 may be configured not to display the home icon on the lock screen.

When detecting the drop of the key icon on the home icon, the smartphone 1 may execute processing different from that of the case where the drop of the key icon in the second area is detected. For example, when detecting the drop of the key icon on the home icon, the smartphone 1 unlocks the locked state and displays the home screen. On the other hand, when detecting the drop of the key icon in the second area, the smartphone 1 unlocks the locked state, and then displays the application if there is an application being already executed, and displays the home screen if there is no application being executed. In this manner, by changing the processing to be executed according to whether the position where the key icon is dropped is on the home icon or in the second area, the smartphone 1 can execute more types of processing quickly from the locked state.

In the processing operation illustrated in FIG. 11, the smartphone 1 determines the detected gesture for the key icon in order of Step S22, Step S27, Step S30, Step S34, and Step S37, but the order of the determination is not specially limited. The smartphone 1 may execute the determinations of Step S22, Step S27, Step S30, Step S34, and Step S37 in any order.

In the processing operation illustrated in FIG. 11, when it is determined at Step S37 that the key icon is released in the first area, the smartphone 1 deletes the displayed sub icons, but it is not limited thereto. After displaying the sub icons at Step S29, the smartphone 1 may delete the displayed sub icons, based on the position of the key icon 64. For example, as illustrated in Step S6 of FIG. 10, when detecting the gesture of superimposing the key icon 64 and the application icon 68b, the smartphone 1 displays the sub icons 78a, 78b and 78c associated with the application icon 68b, but, after that, when detecting the gesture of moving the key icon 64 to the outer area of the sub ring 76, the smartphone 1 may delete the displayed sub icons 78a, 78b and 78c. After displaying the sub icons 78a, 78b and 78c associated with the application icon 68b, when detecting the gesture of superimposing the key icon 64 on other application icons 68a, 68c and 68d, the smartphone 1 may delete the displayed sub icons 78*a*, 78*b* and 78*c*. Therefore, the user can efficiently change the display of the sub icons associated with the respective application icons.

In the processing operation illustrated in FIG. 11, when it is determined at Step S37 that the key icon is not released in the first area, the smartphone 1 proceeds to Step S22 again to repeat the processing, but it is not limited thereto. When it is determined that the key icon is not released in the first area, the smartphone 1 may further determine whether there is a gesture of dropping the key icon in the inner area of the sub ring. When detecting the gesture of dropping the key icon in the inner area of the sub ring, the smartphone 1 may execute the application associated with the application icon located at the center of the sub ring. That is, when the key icon 64 is not dropped in either of the first area, the second area, and the sub icons after displaying the sub icons, the smartphone 1 may execute the application associated with the application icon located at the center of the sub ring.

In the processing operation illustrated in FIG. 11, when it is determined at Step S30 that it is a gesture of releasing the key icon on the application icon, the smartphone 1 executes the unlock processing, but it is not limited thereto. When detecting the gesture of releasing the key icon on the application icon, the smartphone 1 may execute the application associated with the application icon, without executing the unlock processing.

Figure 12:
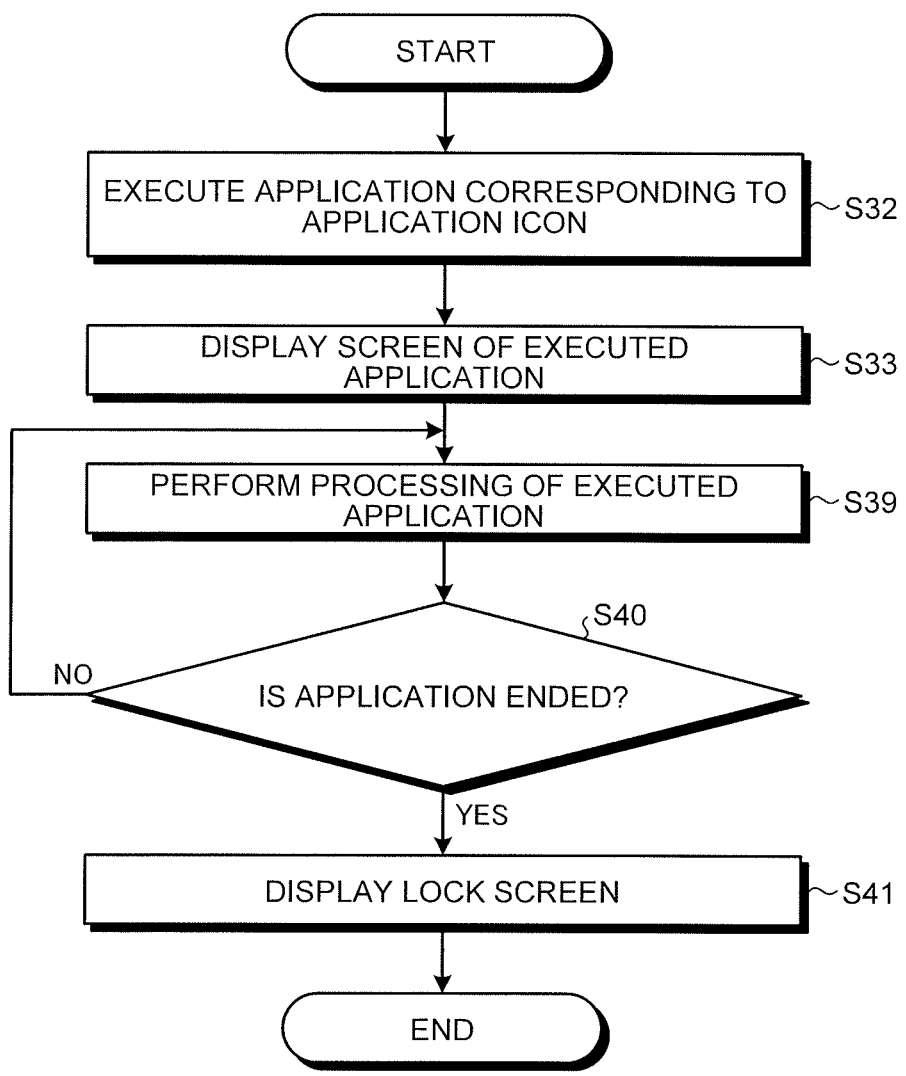
FIG. 12 is a flowchart illustrating another example of a procedure of a control that is performed in a locked state.

FIG. 12 is a flowchart illustrating another example of the procedure of the control that is performed in the locked state. FIG. 12 illustrates another example of the procedure that is performed when it is determined that the gesture of releasing the key icon on the application icon is detected, that is, the procedure that is performed after it is determined as Yes at Step S30 of FIG. 11. The procedure illustrated in FIG. 12 is realized by the controller 10 executing the control program 9A.

When it is determined as Yes at Step S30, the controller 10 executes the application associated with the application icon located at the dropped position at Step S32, and displays the screen of the executed application on the touch screen display 2 at Step S33. When the screen of the executed application is displayed at Step S33, the controller 10 performs the processing of the executed application at Step S39. For example, when a gesture is detected, the controller 10 executes the processing associated with the detected gesture.

When the processing of the application is executed at Step S39, the controller 10 determines whether to end (terminate or suspend) the application at Step S40. For example, when detecting the gesture of ending the application, and when it is determined that a preset processing condition is satisfied, the controller 10 determines to terminate the application. When it is determined not to end the application (No at Step S40), the controller 10 proceeds to Step S39 and performs the processing of the application. When it is determined to end the application (Yes at Step S40), the controller 10 displays the lock screen at Step S41 and ends the processing. That is, when it is determined as Yes at Step S40, the controller 10 proceeds to Step S10 in FIG. 11 and ends the processing illustrated in FIG. 12.

As illustrated in FIG. 12, when detecting the release gesture in the state that the key icon and the application icon are superimposed, the smartphone 1 executes the application associated with the application icon on which the key icon is superimposed, and displays the lock screen again when the application is ended. For example, the smartphone 1 may execute the processing operation of executing the mail application when the key icon and the application icon associated with the mail application are superimposed, and returning to the lock screen when the mail is transmitted. Therefore, the user can use the application associated with the application icon displayed on the lock screen in a state the locked state is not unlocked. That is, the user can execute the predetermined set processing, without inputting the cumbersome unlock gesture.

In a similar manner, in the processing operation illustrated in FIG. 11, when it is determined at Step S34 that the gesture of releasing the key icon on the sub icon is detected, the smartphone 1 executes the unlock processing, but it is not limited thereto. When detecting the gesture of releasing the key icon on the sub icon, the smartphone 1 may execute the particular processing associated with the sub icon, without executing the unlock processing. Subsequently, the smartphone 1 may display the lock screen again when the particular processing is ended.

The smartphone 1 of the embodiment sets the gesture of superimposing the key icon 64 and the application icon 68*b* as the particular gesture for displaying the sub icons 78*a*, 78*b* and 78*c* associated with the application icon 68*b*. Although the smartphone 1 of the embodiment sets the gesture of superimposing the key icon 64 on the application icon as the particular gesture for displaying the sub icons associated with the application icon, the particular gesture for displaying the sub icons is not limited thereto. For example, a gesture of directly tapping the application icon, without the user's operating the key icon 64, may be set as the particular gesture for displaying the sub icons associated with the application icon.

Figure 13:
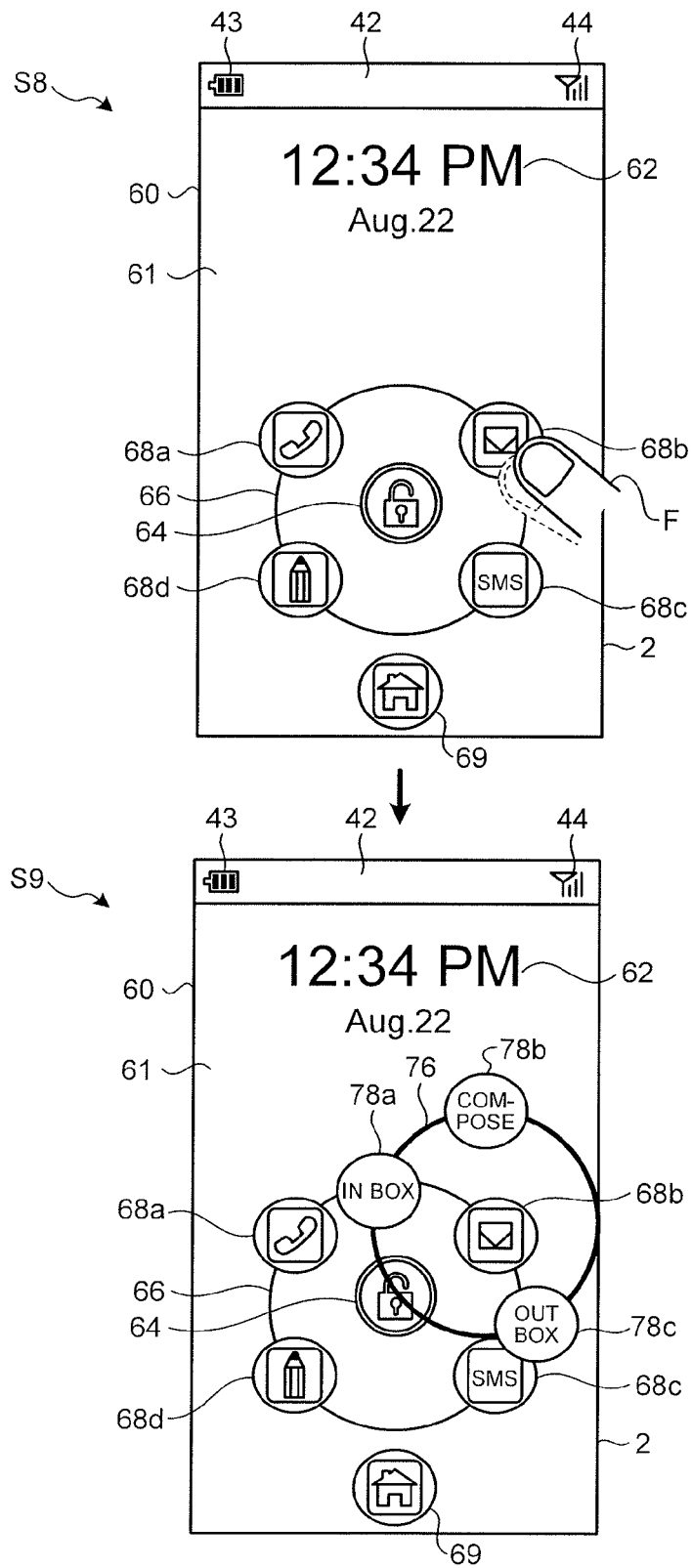
FIG. 13 is a diagram illustrating an example of a control during displaying the lock screen.

Then, an example of the processing of displaying the sub icons, which is executed during displaying the lock screen, will be described with reference to FIGS. 13 and 14. FIG. 13 illustrates an example of the control during displaying the lock screen. At Step S8 illustrated in FIG. 13, the lock screen 60 is displayed on the display 2A, and the user's finger F taps the application icon 68*b*. In this case, the smartphone 1 detects the tap in the portion where the application icon 68*b* is arranged.

At Step S9, the sub icons 78*a*, 78*b* and 78*c* are displayed on the lock screen 60. In this case, at Step S8, when detecting the gesture of tapping the application icon 68*b* as the particular gesture for the application icon 68*b*, the smartphone 1 displays the sub icons 78*a*, 78*b* and 78*c* associated with the application icon 68*b*.

As described above, the smartphone 1 of the embodiment sets the gesture of tapping an application icon as the particular gesture for displaying the sub icons associated with the application icon.

An example of the procedure of displaying update information based on the functions provided by the control program 9A will be described with reference to FIG. 14. FIG. 14 illustrates the procedure of the control that is performed in the locked state, in particular, the control that is performed during displaying the lock screen. The procedure illustrated in FIG. 14 is realized by the controller 10 executing the control program 9A. The procedure illustrated in FIG. 14 is performed as a part of the processing of Step S20. At Step S20 of FIG. 11, the controller 10 may execute another procedure for control related to the lock screen 60 in parallel with the procedure illustrated in FIG. 14.

The controller 10 determines at Step S42 whether the detected gesture is a gesture of tapping the application icon. That is, as illustrated in FIG. 13, the controller 10 determines whether a tap is detected in the portion where the application icon 68*b* is arranged.

When it is determined at Step S42 that the detected gesture is the gesture of tapping the application icon (Yes at Step S42), the controller 10 determines at Step S43 whether there are sub icons associated with the application icon. When it is determined at Step S42 that there is no gesture of tapping the application icon (No at Step S42), the controller 10 ends the processing.

When it is determined at Step S43 that there are the sub icons associated with the application icon (Yes at Step S43), the controller 10 displays the sub icons on the lock screen at Step S44. For example, as illustrated in FIG. 13, when detecting the particular gesture for the application icon 68b (in FIG. 13, the gesture of tapping the application icon 68b), the controller 10 displays the sub icons 78a, 78b and 78c on the lock screen 60. Then, the processing is ended. When it is determined at Step S43 that there are no sub icons associated with the application icon (No at Step S43), the controller 10 ends the processing.

Figure 14:
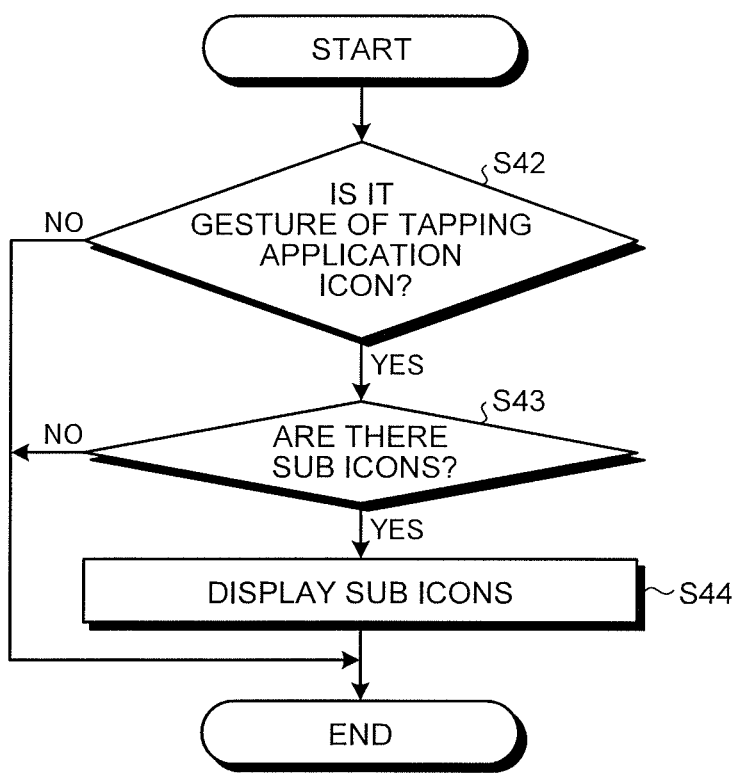
FIG. 14 is a flowchart illustrating procedures of a control that is performed in a locked state.

As illustrated in FIGS. 13 and 14, when the gesture of tapping the application icon 68b is detected as the particular gesture for the application icon 68b so as to display the sub icons 78a, 78b and 78c, the smartphone 1 displays the sub icons 78a, 78b and 78c associated with the application icon 68b. Therefore, the user can display the sub icons 78a, 78b and 78c associated with the application icon 68b on the lock screen by just tapping the application icon, without performing the operation of superimposing the key icon 64 on the application icon. Furthermore, the user can execute desired processing quickly from the lock screen by selecting a sub icon associated with the desired processing from among the displayed sub icons 78a, 78b and 78c.

The smartphone 1 may display the sub icons associated with the respective application icons 68a to 68c displayed on the lock screen by other gestures. For example, when detecting gesture of double tap, long tap, or the like for the application icon 68b, the smartphone 1 may display the sub icons associated with the application icon. In this case, after displaying the sub icons, when detecting again the particular gesture (tap or the like) for the application icon, the smartphone 1 may delete the sub icons displayed on the lock screen.

In the embodiment, the example in which the sub icons are associated with the particular processing executable in the mail application has been described; however, a manner in which the sub icons are displayed is not limited thereto. Examples of the particular processing executable in the mail application include incoming mail check processing, new mail composition processing, outgoing mail check processing, and the like. As in the case of the application icon, the sub icon may be associated with an arbitrary application installed in the smartphone 1. Thus, the user can hierarchically organize the applications executable on the lock screen by associating the applications being used frequently with the application icons of an upper layer and associating the applications being used sometimes with the sub icons of a lower layer.

In the embodiment, the example in which the sub icons are associated with the application icon has been described; however, third icons of a lower layer may be associated with the sub icons. Thus, the user can use groups of icons (that is, the application icon of the upper layer, the sub icons of the intermediate layer, and the third icons of the lower layer) that function as the short-cuts of the applications executable on the lock screen or the particular processing executable on the lock screen. As a result, the operability and convenience of the lock screen are further improved.

In the embodiment, the application icons are associated with the sub icons, but may not be necessarily associated with the applications. Therefore, the user can use the application icons as folders for organizing the sub icons. That is, the user can organize the sub icons into desired categories by using the application icons of the upper layer displayed on the lock screen as the folders. For example, the user can set the image of the application icon displayed on the lock screen to a character string (for example, "amusement", "work", "private", and the like) representing a category, and associate the sub icons with the application icon according to the intended category. As a result, the operability and convenience of the lock screen are further improved.

Figure 15:
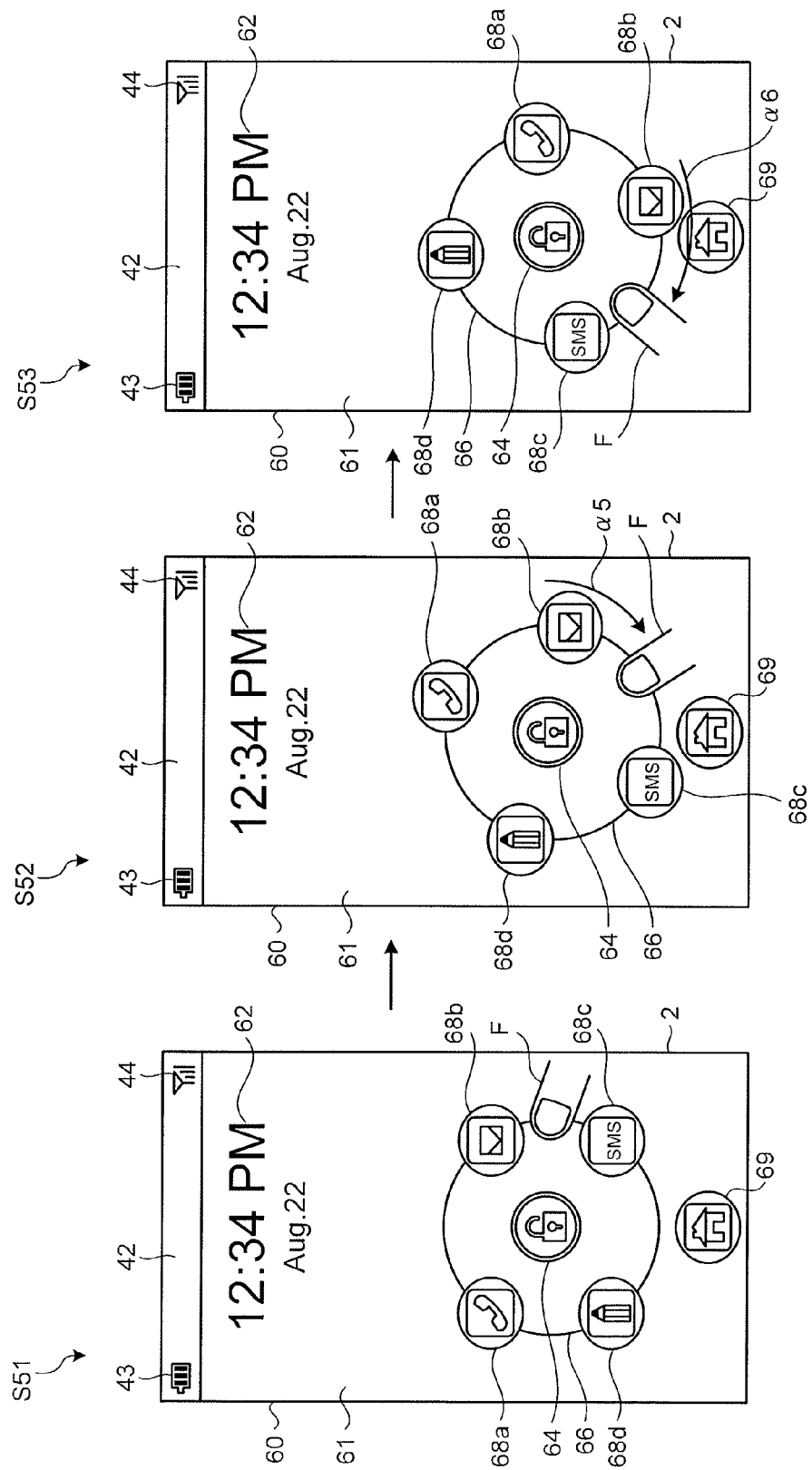
FIG. 15 is a diagram illustrating an example of a control during displaying the lock screen.

Then, an example of the processing of moving the position of the application icon executed during displaying the lock screen will be described with reference to FIGS. 15 and 16. FIG. 15 illustrates an example of the control during displaying the lock screen. At Step S51 illustrated in FIG. 15, the lock screen 60 is displayed on the display 2A. At Step S51, the user's finger F touches the ring 66. In this case, the smartphone 1 detects the touch in the portion where the ring 66 is arranged.

At Step S52, the user swipes his/her finger F along the ring 66. After the user's finger F touches the position where the ring 66 is displayed at Step S51, the user swipes the finger F along a path indicated by an arrow α5. In this case, the smartphone 1 detects the swipe along the ring 66. When detecting such a swipe, the smartphone 1 rotates the application icons 68a, 68b, 68c and 68d arranged on the ring 66, based on a movement amount of the swipe on the ring 66, in the embodiment, an angle of an arc of the swipe. That is, in such a state that the ring 66 and the application icons 68a, 68b, 68c and 68d arranged on the ring 66 are connected together, the smartphone 1 rotates the ring 66 and the application icons 68a, 68b, 68c and 68d by using the center of the ring 66 as the rotational axis. By rotating the ring 66 without changing the shape of the ring 66, the smartphone 1 may display as if only the application icons 68a, 68b, 68c and 68d are rotated.

At Step S53, the user swipes his/her finger F along the ring 66. After the user's finger F touches the position where the ring 66 is displayed at Step S51, the user swipes the finger F along a path indicated by an arrow α5, and also swipes the finger F along a path indicated by an arrow α6. In this case, the smartphone 1 detects the swipe along the ring 66. When detecting such a swipe, the smartphone 1 further rotates the application icons 68a, 68b, 68c and 68d arranged on the ring 66, based on a movement amount of the swipe, in the embodiment, an angle of an arc of the swipe on the ring 66.

An example of the procedure of the control based on the functions provided by the control program 9A will be described with reference to FIG. 16. FIG. 16 illustrates the procedure of the control that is performed in the locked state, in particular, the control that is performed during displaying the lock screen. The procedure illustrated in FIG. 16 is realized by the controller 10 executing the control program 9A. The procedure illustrated in FIG. 16 is performed as a part of the processing of Step S20. At Step S20 of FIG. 10, the controller 10 may execute another procedure for control related to the lock screen 60 in parallel with the procedure illustrated in FIG. 16.

The controller 10 determines at Step S60 whether detected gesture is a swipe along the ring 66. That is, the controller 10 determines whether a gesture of touching the area where the ring 66 is displayed and swiping along the ring 66, as illustrated in FIG. 15, is detected. When it is determined at Step S60 that detected gesture is the swipe along the ring 66 (Yes at Step S60), the controller 10 changes the display position of the application icons at Step S62. That is, the controller 10 rotates the application icons 68a, 68b, 68c and 68d arranged on the ring 66, based on the swipe detected at Step S60. When the display position of the application icon is changed at Step S62, the controller 10 ends the processing. When it is determined at Step S60 that there is no swipe along the ring 66 (No at Step S60), the controller 10 ends the processing.

Figure 16:
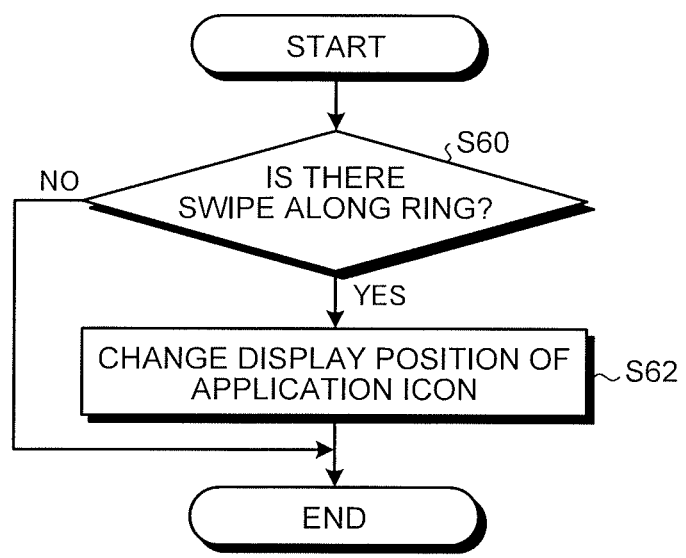
FIG. 16 is a flowchart illustrating a procedure of a control that is performed in a locked state.

As described in FIGS. 15 and 16, when detecting the gesture of swiping along the ring 66, the smartphone 1 rotates the application icons 68a, 68b, 68c and 68d arranged on the ring 66. Therefore, the user can easily adjust the positions of the application icons 68a, 68b, 68c and 68d on the lock screen, and move the desired application icon to the position where it is easy to drop the key icon 64.

The smartphone 1 may be configured to adjust the positions of the application icons 68a, 68b, 68c and 68d displayed on the lock screen by other gestures. For example, when detecting the swipe, of which the start point is the application icon and the end point is an arbitrary position on the ring 66, that is, when detecting the drop of the application icon on the arbitrary position on the ring 66, the smartphone 1 may move the display position of the application icon to the dropped position. When detecting the swipe, of which the start point is the application icon and the end point is other application icon on the ring 66, that is, when detecting the drop of the application icon on other application icon, the smartphone 1 may exchange the display position of the application icon with the display position of other application icon.

Figure 17A:
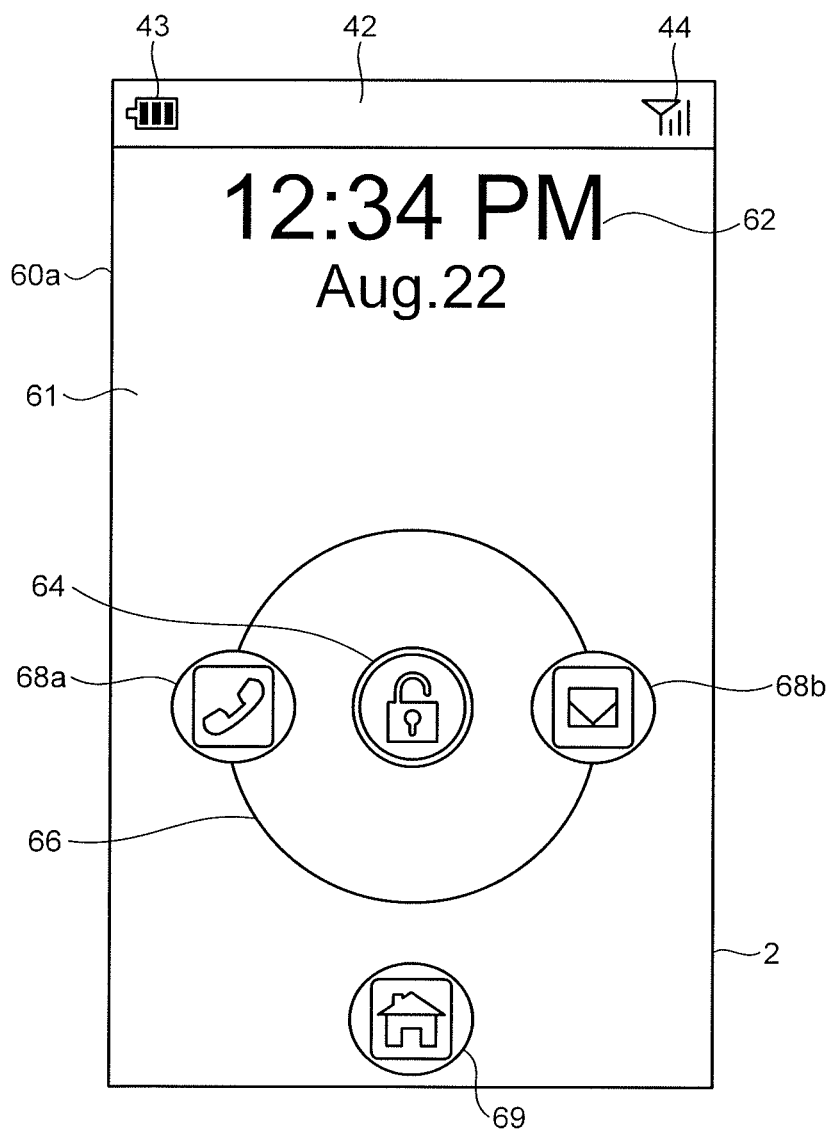
FIG. 17A is a diagram illustrating an example of the lock screen.
Figure 17B:
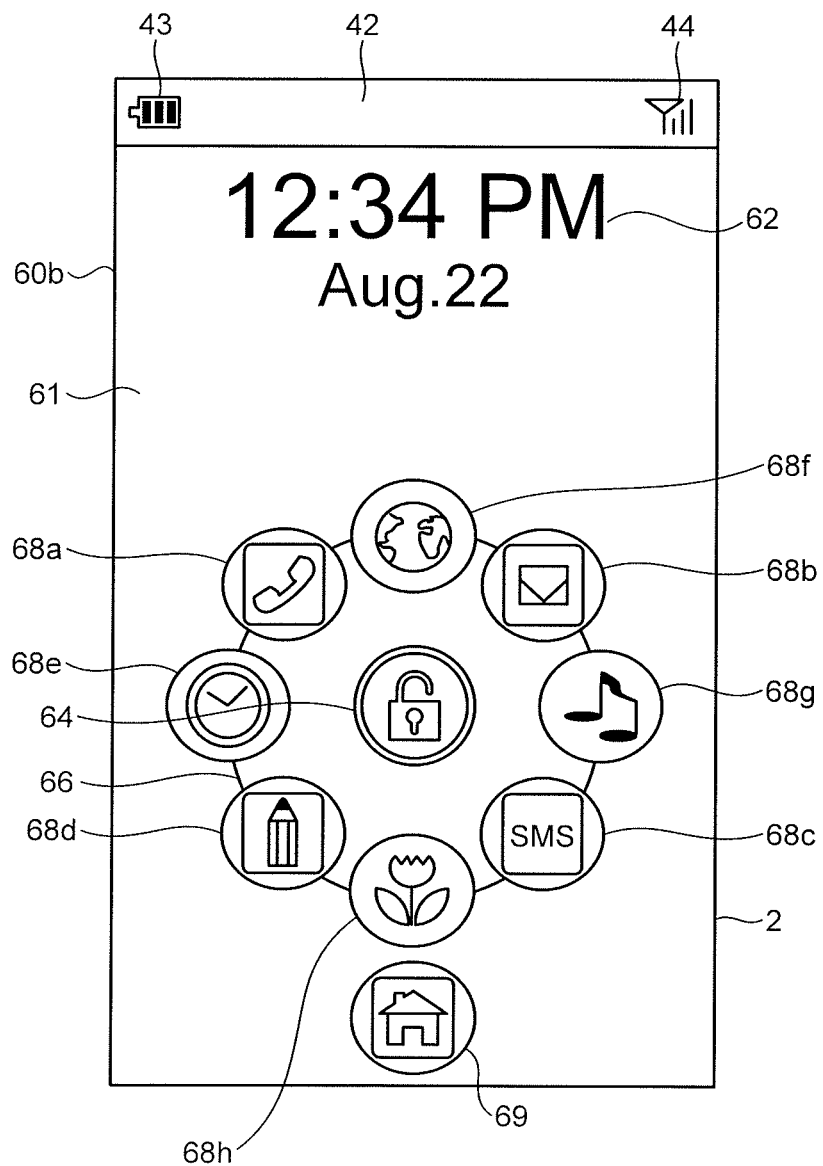
FIG. 17B is a diagram illustrating an example of the lock screen.
Figure 17C:
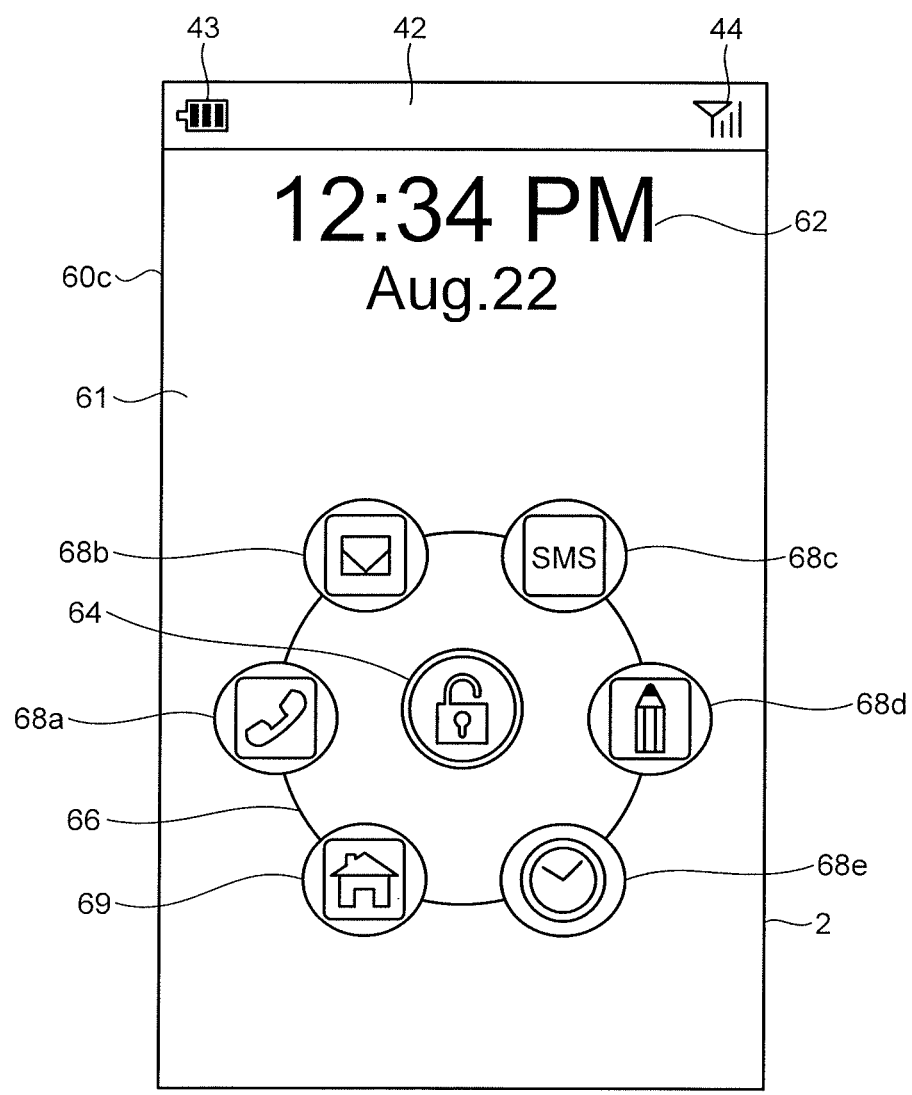
FIG. 17C is a diagram illustrating an example of the lock screen.

Another example of the lock screen will be described with reference to FIGS. 17A to 17C. FIGS. 17A to 17C illustrate examples of the respective lock screens. Although the lock screen 60 displays four application icons 68a, 68b, 68c and 68d on the ring 66, the number of the application icons is not limited thereto. For example, the lock screen 60a illustrated in FIG. 17A displays two application icons of the application icons 68a and 68b on the ring 66. The lock screen 60b illustrated in FIG. 17B displays eight application icons of the application icons 68a, 68b, 68c, 68d, 68e, 68f, 68g and 68h on the ring 66. The lock screens 60a and 60b have the same configuration as the lock screen 60, except for the number of the application icons. As illustrated in FIGS. 17A and 17B, the smartphone 1 can display an arbitrary number of the application icons on the lock screen.

The smartphone 1 may display the home icon 69 on the ring 66. Specifically, the lock screen 60c illustrated in FIG. 17C displays five application icons of the application icons 68a, 68b, 68c, 68d and 68e and the home icon 69 on the ring 66. The home icon 69 is displayed between the application icon 68a and the application icon 68e.

The shape of the ring 66 of the lock screen is not limited to a circle. The ring 66 has only to divide the lock screen into a first area, which includes the key icon 64, and a second area, which does not include the key icon 64. The ring 66 has only to have a frame surrounding the outer edge of the key icon 64. The frame surrounding the outer edge of the key icon 64 may have various shapes, such as a polygon, an ellipse, and a combined shape of a curve and a straight line. The ring 66 may be displayed on the lock screen. By displaying the ring 66 on the lock screen, the smartphone 1 can clearly indicate the user the boundary between the first area and the second area. Therefore, the user can execute the desired processing more reliably.

By displaying the application icon on the ring 66 or the frame, which is the boundary between the first area and the second area, the smartphone 1 can facilitate the input of the gesture of superimposing the application icon and the key icon, while suppressing the application from being executed by erroneous operations. Therefore, it is preferable to display the application icon on the ring 66 or the frame, but the smartphone 1 may also display the application icon on the area that does not overlap the ring 66 or the frame.

Figure 18:
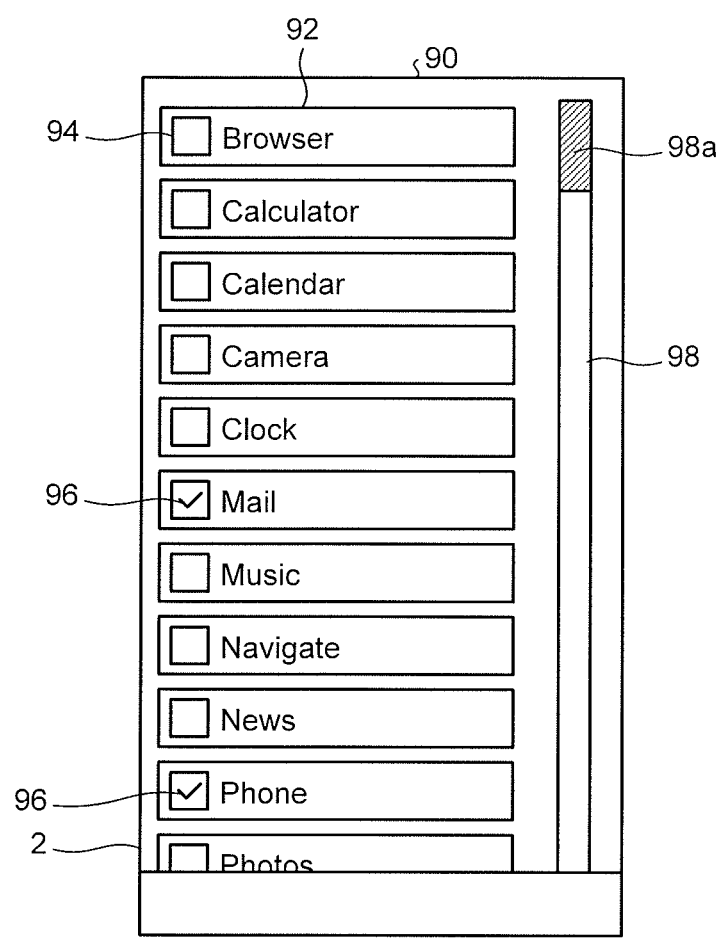
FIG. 18 is a diagram illustrating an example of an icon setting screen.

Then, the control for setting up the display content of the lock screen will be described with reference to FIGS. 18 to 22. FIG. 18 illustrates an example of an icon setting screen. The icon setting screen 90 illustrated in FIG. 18 displays a plurality of items 92, check boxes 94 corresponding to the items 92, and a scroll bar 98. Check marks 96 are displayed in some of the check boxes 94.

The items 92 are images indicating applications that can be executed by the smartphone 1 and can be displayed as application icons. The items 92 display character information set to the applications, specifically, application names. The icon setting screen 90 creates the items 92 with respect to respective applications that are executable by the smartphone 1, and displays the items 92 as a list.

The check boxes 94 are square frames and are displayed on the left of the respective items 92. The check boxes 94 are display areas for representing whether the items 92 are selected. The check box 96 is an image for representing whether the item 92 corresponding to the check box 94 is selected as the item to be displayed as the application icon. As described above, in the check box 94, the check mark 96 is displayed when the item 92 is selected, and the check mark 96 is not displayed when the item 92 is unselected. The scroll bar 98 is an image representing to which area of the entire icon setting screen 90 the area currently displayed on the display 2A corresponds. When detecting an operation of moving an object 98a representing a current position of the scroll bar 98, the smartphone 1 scrolls the icon setting screen 90 displayed on the display 2A, based on the detected operation.

Although the items 92 are displayed as the images of character information of the application names, the icon setting screen 90 is not limited thereto. The icon setting screen 90 may use, as the items 92, images of the application icons associated with the applications, or images of the icons displayed on the home screen.

The smartphone 1 displays the icon setting screen 90, and determines the application icon to be displayed on the lock screen, based on the operation detected during displaying the icon setting screen 90.

Figure 19:
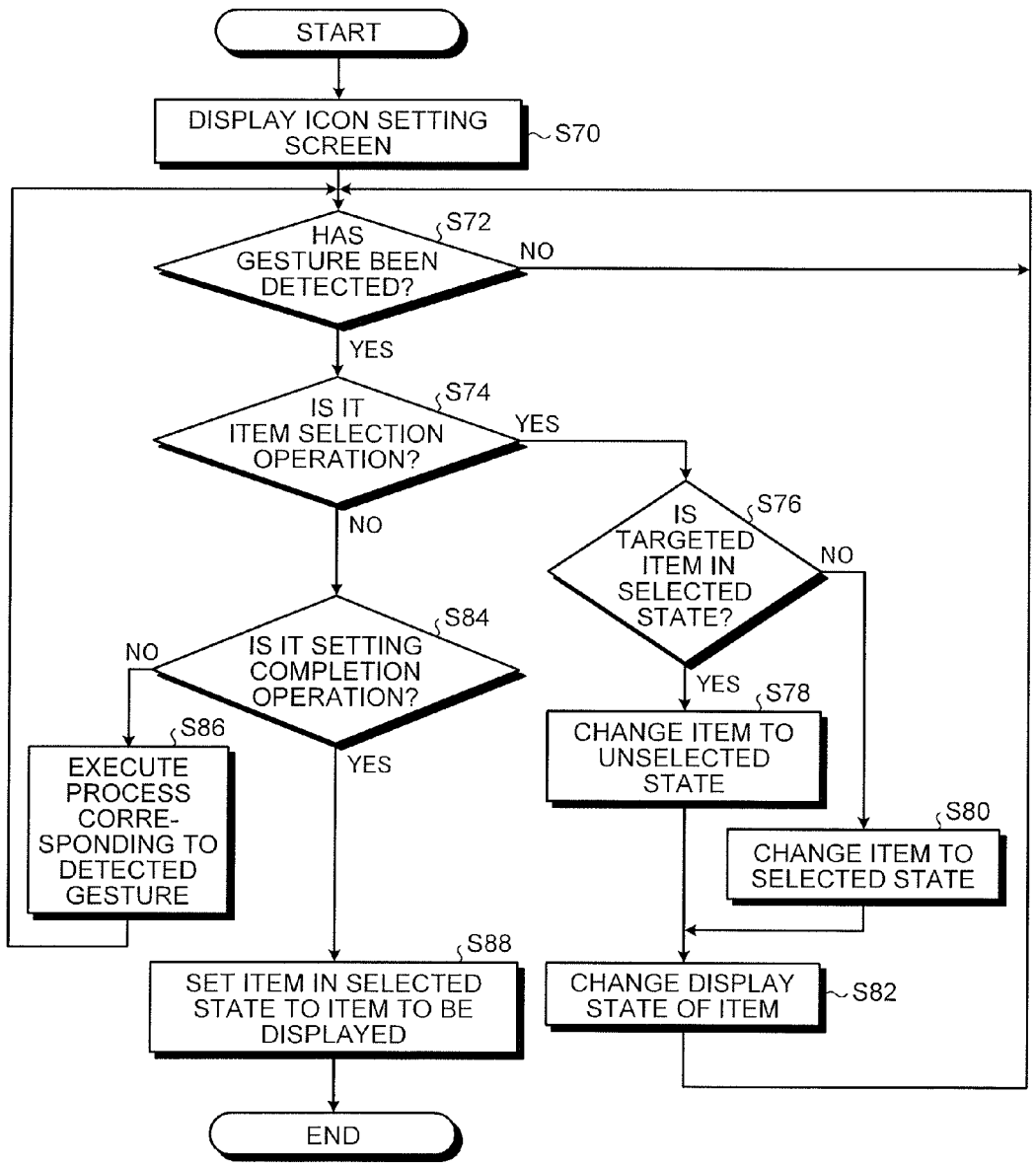
FIG. 19 is a flowchart illustrating a procedure of a control for setting up display content of the lock screen.

The procedure of the control based on the functions provided by the control program 9A, specifically the procedure of the control of the processing of determining the application icon displayed on the lock screen, will be described with reference to FIG. 19. FIG. 19 is a flowchart illustrating the procedure of the control for setting up the display content of the lock screen. The procedure illustrated in FIG. 19 is realized by the controller 10 executing the control program 9A. The procedure illustrated in FIG. 19 is executed, for example, when the operation of executing the setting application of the application icon displayed on the lock screen is detected.

The controller 10 displays the icon setting screen at Step S70, that is, the screen illustrated in FIG. 18, on the touch screen display 2. When the icon setting screen is displayed at Step S70, the controller 10 determines at Step S72 whether a gesture has been detected. That is, the controller 10 obtains the detection result of the touch screen 2B, and determines whether a gesture is detected based on the obtained detection result. When it is determined at Step S72 that no gesture has been detected (No at Step S72), the controller 10 proceeds to Step S72 and determines again whether a gesture has been detected.

When it is determined at Step S72 that a gesture has been detected (Yes at Step S72), the controller 10 determines at Step S74, whether the gesture is an item selection operation. That is, the controller 10 determines whether the gesture detected at Step S72 is a gesture of selecting the item displayed on the icon setting screen. The gesture of selecting the item displayed on the icon setting screen is a preset particular gesture selected among various gestures. The gesture of selecting the item displayed on the icon setting screen may use a tap, a long tap, or a double tap with respect to the area where the item is displayed, and may use a tap, a long tap, a double tap, or the like with respect to the area where the check box corresponding to the item is displayed.

When it is determined at Step S74 that the gesture is the item selection operation (Yes at Step S74), the controller 10 determines at Step S76 whether the targeted item is in a selected state. That is, the controller 10 detects the state of the item determined as selected at Step S74, and determines whether the item is in a selected state, in the embodiment, whether there is the check mark 96 in the check box 94 corresponding to the item 92.

When it is determined at Step S76 that the item is in the selected state (Yes at Step S76), the controller 10 changes the item to an unselected state at Step S78, and proceeds to Step S82. When it is determined at Step S76 that the item is not in the selected state (No at Step S76), the controller 10 changes the item to a selected state at Step S80, and proceeds to Step S82.

When the processing of Step S78 or Step S80 is executed, the controller 10 changes the display state of the item at Step S82. That is, the controller 10 clears the check mark of the check box of the item changed to the unselected state at Step S78, and displays the check mark in the check box of the item changed to the selected state at Step S80. When the processing of Step S82 is executed, the controller 10 proceeds to Step S72 and repeats the above-described processing.

When it is determined at Step S74 that the gesture is not the item selection operation (No at Step S74), the controller 10 determines at Step S84 whether the gesture is the setting completion operation. When it is determined at Step S84 that the gesture is not the setting completion operation (No at Step S84), the controller 10 executes the process corresponding to the detected gesture at Step S86, and proceeds to Step S72. Examples of the process corresponding to the detected gesture include screen scroll processing of the icon setting screen, display processing of screens displayable on the icon setting screen, for example, a help screen, and the like. When it is determined at Step S84 that the gesture is the setting completion operation (Yes at Step S84), the controller 10 sets the item in the selected state to an item to be displayed at Step S88. That is, the controller 10 sets the application of the item in the selected state to the application displaying the application icon on the lock screen. When the display item is set at Step S88, the controller 10 ends the processing.

Figure 20:
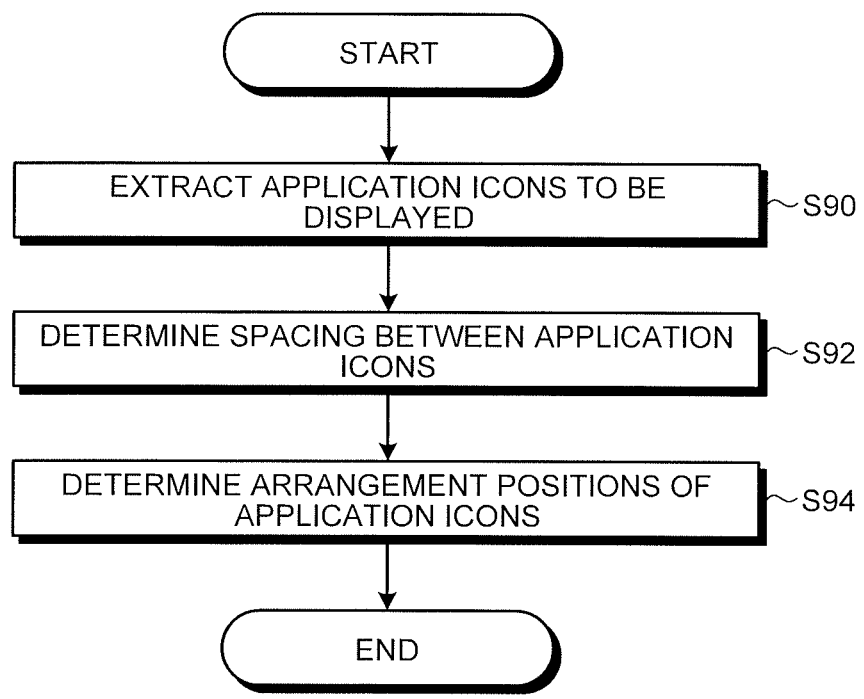
FIG. 20 is a flowchart illustrating a procedure of a control for setting up display content of the lock screen.

The procedure of the control based on the functions provided by the control program 9A, specifically the procedure of the control of setting the display position of the application icon to be displayed, will be described with reference to FIG. 20. FIG. 20 is a flowchart illustrating the procedure of the control for setting up the display content of the lock screen, in particular, the procedure of the control for setting up the display position of the application icon to be displayed. The procedure illustrated in FIG. 20 is realized by the controller 10 executing the control program 9A. The procedure illustrated in FIG. 20 is executed when the setting processing of the application icon to be displayed is completed, or when the operation of displaying on the lock screen is detected at first after the setting processing of the application icon to be displayed is completed. The procedure illustrated in FIG. 20 may be executed whenever the operation of displaying on the lock screen is detected.

The controller 10 extracts the application icons to be displayed at Step S90. Specifically, the controller 10 extracts the application set to the display item in the above-described processing, and extracts the application icons associated with the extracted applications as the application icons to be displayed.

When the application icons are extracted at Step S90, the controller 10 determines the spacing between the application icons at Step S92. Specifically, the controller 10 determines the spacing between the application icons on the ring 66, based on the number of the extracted application icons. The spacing may be equal and may be changed by position. For example, the controller 10 may set the ranks of the application icons and determine the spacing such that the distance to the adjacent icon application is increased with respect to the application icons whose ranks are set as high, and the distance to the adjacent icon application is decreased with respect to the application icons whose ranks are set as low. Thus, the icon applications having the high ranks are arranged far from other applications, so that the key icon can be easily superimposed thereon.

When the spacing is determined at Step S92, the controller 10 determines the arrangement positions of the application icons at Step S94. That is, the controller 10 determines the arrangement positions on the lock screen with respect to the application icons extracted at Step S90, based on the spacing determined at Step S92. The controller 10 arranges the application icons at the positions superimposed on the ring 66 with the determined spacing. The application icons may be arranged on the ring 66 in various orders. The application icons may be arranged on the ring 66 in order set in advance by the user.

As illustrated in FIGS. 19 and 20, the smartphone 1 may allow the user to select the application icon to be displayed on the lock screen. Accordingly, since the desired application icon can be displayed on the lock screen, the user can execute the desired application quickly.

By determining the spacing based on the number of the application icons to be displayed, the smartphone 1 can arrange the application icons on the ring with appropriate spacing. Therefore, the user can easily drop the key icon on the respective application icons arranged on the ring.

Although the case of automatically arranging the application icons has been described in FIG. 20, a manner of arranging the application icons is not limited thereto. The smartphone 1 may determine the arrangement positions of the application icons based on the gesture detected through the touch screen display 2.

Figure 21:
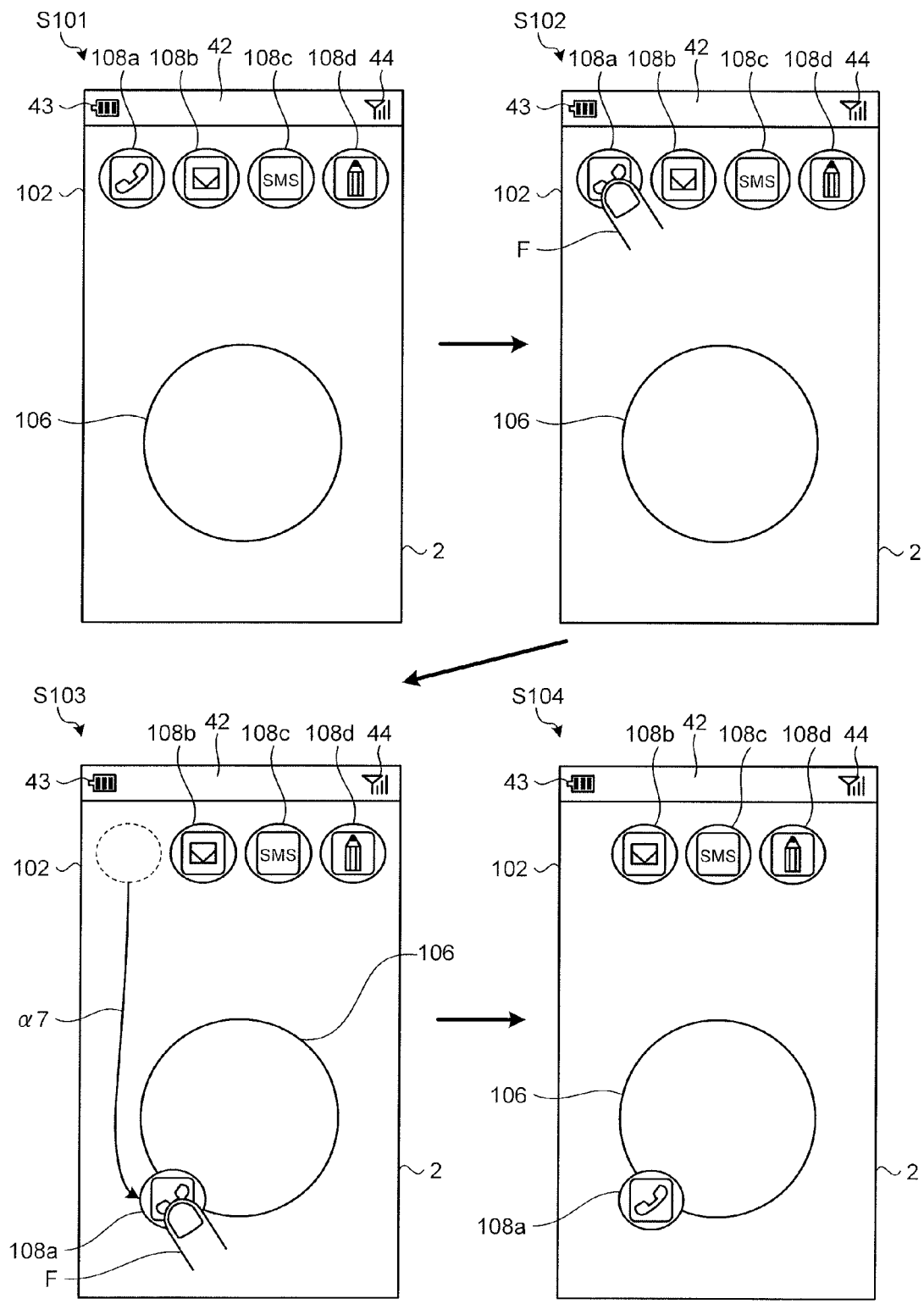
FIG. 21 is a diagram illustrating an example of a control for setting up display content of the lock screen.

Hereinafter, an example of the control that determines the arrangement positions of the application icons, based on the gesture detected through the touch screen display 2, will be described with reference to FIGS. 21 and 22. FIG. 21 illustrates an example of the control for setting up the display content of the lock screen.

At Step S101 illustrated in FIG. 21, an icon position setting screen 102 is displayed on the display 2A. The icon position setting screen 102 is a screen for setting the display positions of the application icons to be displayed on the lock screen. On the icon position setting screen 102, a ring 106 and application icons 108a, 108b, 108c and 108d are arranged. On the icon position setting screen 102, the same area 42 as the area 42 of the home screen 40 is arranged at the top edge of the display 2A. On the icon position setting screen 102, a remaining mark 43 indicating a remaining amount of a power supply and a radio-wave level mark 44 indicating electric field strength of radio wave for communication are displayed in the area 42.

The ring 106 is an image having a circular frame shape, and is displayed at the same position as that of the ring 66 displayed on the lock screen 60. The ring 106 is an image corresponding to the ring 66 of the lock screen 60. The ring 106 becomes a reference for determining the positions of the applications icons 108a, 108b, 108c and 108d in the icon position setting screen 102.

The application icons 108a, 108b, 108c and 108d are the same images as the respective application icons 68a, 68b, 68c and 68d of the lock screen 60. The application icons 108a, 108b, 108c and 108d are arranged under the area 42 in a row.

At Step S102, the user's finger F touches the application icon 108a. In this case, the smartphone 1 detects the touch in the portion where the application icon 108a is arranged.

At Step S103, the user's finger F drops the application icon 108a on the ring 106. That is, the user uses his/her finger F to touch the area where the application icon 108a is displayed at Step S102, drags the application icon 108a along a path indicated by an arrow α7, and releases the application icon 108a in the area where the ring 106 is displayed. In this case, the smartphone 1 detects the swipe, of which the start point is the portion where the application icon 108a is arranged and the end point is the portion where the ring 106 is arranged. That is, the smartphone 1 detects the drop of the application icon 108a on the ring 106.

At Step S104, the application icon 108a is arranged on the ring 106. That is, when the drop is detected, as illustrated in Step S104, the smartphone 1 sets the position on the ring 106, at which the application icon 108a is dropped, as the display position of the application icon 108a.

By inputting the same gesture with respect to the application icons 108b, 108c and 108d, the user can determine the positions of the respective application icons 108b, 108c and 108d on the ring 106. When detecting the drop of the respective application icons 108b, 108c and 108d on the ring 106, the smartphone 1 sets the dropped positions on the ring 106 as the display positions of the dropped application icons. When detecting the drop of the application icons 108a, 108b, 108c or 108d on the area where the application icon is not superimposed with the ring 106, the smartphone 1 of the embodiment returns the dropped application icon to the position of prior to the drop.

The procedure of the control based on the functions provided by the control program 9A, specifically the procedure of the control of the processing of determining the display positions of the application icons to be displayed on the lock screen, will be described with reference to FIG. 22. FIG. 22 is a flowchart illustrating the procedure of the control for setting up the display content of the lock screen. The procedure illustrated in FIG. 22 is realized by the controller 10 executing the control program 9A. The procedure illustrated in FIG. 22' is executed, for example, when the operation of executing the application for determining the display positions of the application icons to be displayed on the lock screen is detected.

The controller 10 displays the icon position setting screen at Step S120, that is, the screen illustrated in Step S101 of FIG. 21, on the touch screen display 2. When the icon position setting screen is displayed at Step S120, the controller 10 determines at Step S122 whether a gesture has been detected. That is, the controller 10 obtains the detection result of the touch screen 2B, and determines whether a gesture is detected based on the obtained detection result. When it is determined at Step S122 that no gesture has been detected (No at Step S122), the controller 10 proceeds to Step S122 and determines again whether a gesture has been detected.

When it is determined at Step S122 that a gesture has been detected (Yes at Step S122), the controller 10 determines at Step S124 whether the detected gesture is a touch on the icon. That is, the controller 10 determines whether the gesture detected at Step S122 is a touch on the application icon displayed on the icon position setting screen.

When it is determined at Step S124 that the gesture is the touch on the icon (Yes at Step S124), the controller 10 determines at Step S126 whether a release has been detected. That is, the controller 10 determines whether the touch on the application icon, which is detected at Step S124 is released. When it is determined at Step S126 that there is no release (No at Step S126), that is, when it is determined that the touch on the application icon is continued, the controller 10 proceeds to Step S126 and determines again whether a release has been detected.

When it is determined at Step S126 that a release has been detected (Yes at Step S126), the controller 10 determines at Step S128 whether the release position is on the ring. That is, the controller 10 determines whether the position of the release determined as being present at Step S126 is on the ring, that is, whether the application icon is dropped on the ring.

When it is determined at Step S128 that the release position is on the ring (Yes at Step S128), the controller 10 sets the release position as the icon display position at Step S130. That is, the controller 10 sets the position on the ring, at which the application icon is dropped, as the display position of the application icon. When the display position of the icon is changed at Step S130, the controller 10 proceeds to Step S122.

When it is determined at Step S128 that the release position is not on the ring (No at Step S128), that is, when it is determined that the position of the dropped application icon is the position where the application icon is not superimposed with the ring, the controller 10 invalidates the operation of moving the icon at Step S132. That is, the controller 10 returns the dropped application icon to the position touched at Step S124, that is, the position of prior to movement. When the operation of moving the icon is invalidated at Step S132, the controller. 10 proceeds to Step S122.

When it is determined at Step S124 that the gesture is not the touch on the icon (No at Step S124), the controller 10 determines at Step S134 whether the gesture is the setting completion operation. When it is determined at Step S134 that the gesture is not the setting completion operation (No at Step S134), the controller 10 executes the process corresponding to the detected gesture at Step S136, and proceeds to Step S122. Examples of the process corresponding to the detected gesture include processing of adding the application icon to the icon position setting screen, display processing of screens displayable on the icon position setting screen, for example, a help screen, and the like. When it is determined at Step S134 that the gesture is the setting completion operation (Yes at Step S134), the controller 10 determines the display position of the icon at Step S138. That is, the controller 10 sets the position of the application icon, which is displayed on the ring of the icon position setting screen at the time point when the setting operation is determined as being completed, as the display position of the application icon. The controller 10 sets the application icons, which are not displayed on the ring, as icons which are not displayed on the lock screen. When the display position of the icon is set at Step S138, the controller 10 ends the processing.

Figure 22:
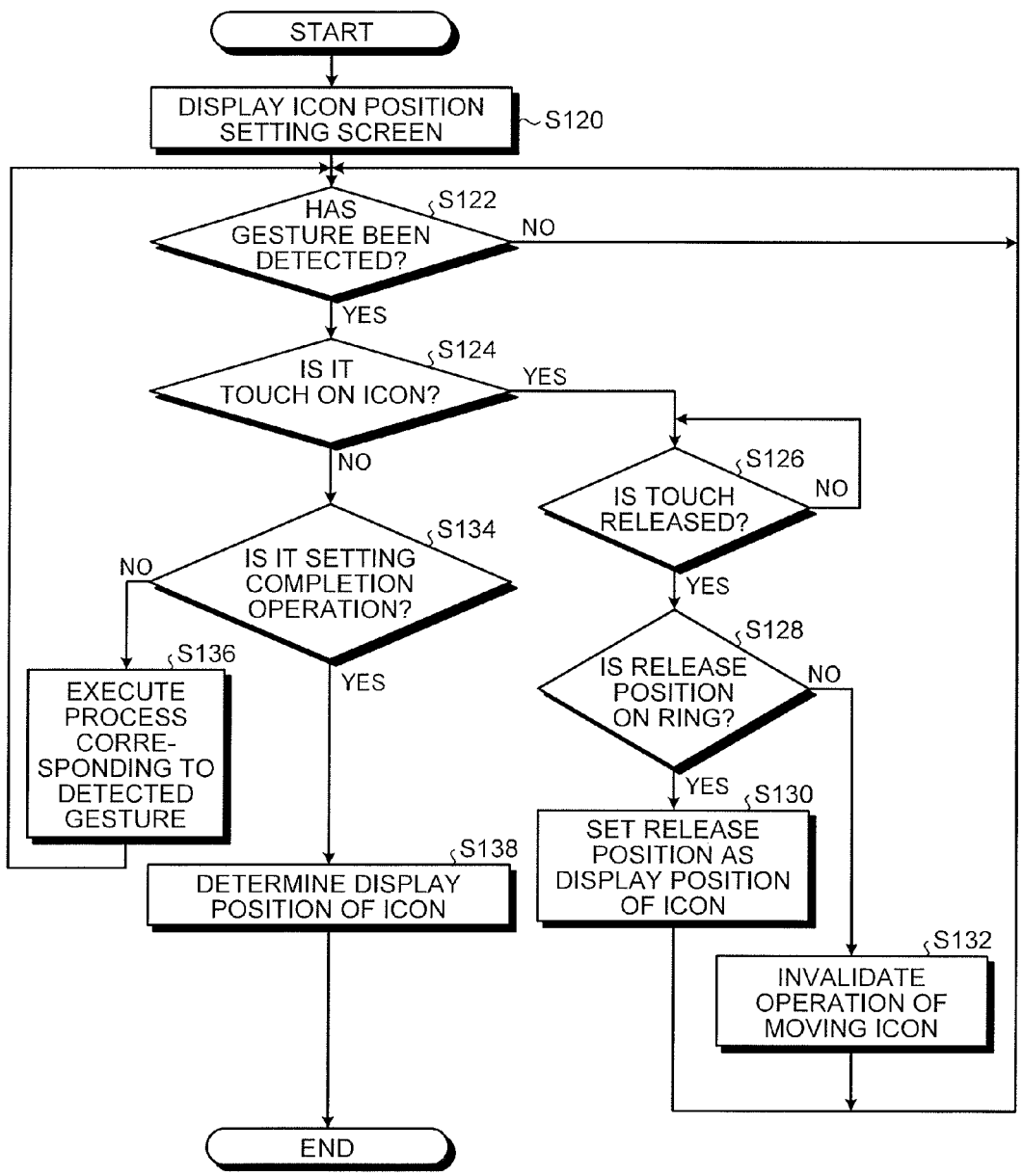
FIG. 22 is a flowchart illustrating a procedure of a control for setting up display content of the lock screen.

As illustrated in FIGS. 21 and 22, the smartphone 1 can adjust the display positions of the application icons, based on the gesture of the user. Therefore, the application icons can be displayed on the lock screen in an arrangement that allows the user to use the application icons more easily.

In the examples illustrated in FIGS. 21 and 22, when the icon is dropped on the position where the icon is not superimposed on the ring, the smartphone 1 invalidates the operation of moving the icon. However, even when the icon is dropped on the position where the icon is not superimposed on the ring, the smartphone 1 may also change the display position of the icon to the dropped position. The smartphone 1 may continue the processing of FIG. 22 until the entire application icons arranged on the lock screen are arranged on the ring. The smartphone 1 may set the initial state of the icon position setting screen as a state in which the application icons are automatically arranged on the ring. Thus, the user can arrange the entire application icons on the ring by just adjusting the positions of the application icons.

The smartphone 1 may allow the use of only the application icons associated with the preset applications. That is, the smartphone 1 may disable the modification of the application icons to be displayed on the lock screen.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

In the embodiment, the smartphone has been explained as an example of the device provided with the touch screen display; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:
1. A device, comprising:
a touch screen display configured to display a lock screen, the lock screen at least including a first icon not associated with any applications and a plurality of second icons each associated with an application; and
a controller,
wherein,
while displaying the first icon and the plurality of second icons on the lock screen and without displaying a sub icon on the lock screen,
in response to a detection of a gesture in which the first icon and one of the plurality of second icons are superimposed,
the controller is configured to simultaneously display the first icon and a sub icon corresponding to the superimposed second icon, the sub icon corresponding to a process executable in the application associated with the superimposed second icon,
when the first icon, the plurality of second icons, and the sub icon are simultaneously displayed on the lock screen,
the first icon is moveable to be superimposed on the plurality of second icons and the sub icon,
the controller is configured to execute the process associated with the sub icon, in response to a gesture in which the first icon and the sub icon are superimposed, and
the controller is configured to execute an application among the applications and associated with a second icon among the plurality of second icons, in response to a gesture in which the first icon and the second icon are superimposed.

2. The device according to claim 1, wherein
the touch screen display is configured to display the lock screen including a first area in which the first icon is arranged and a second area,
the first and second areas are separated by a closed shape boundary,
the first area is surrounded by the closed shape boundary,
the closed shape boundary is surrounded by the second area, and
each of the plurality of second icons is arranged on the closed shape boundary and extends into both the first and second areas.

3. The device according to claim 1, wherein the first icon is a key icon configured to unlock a locked state in which the lock screen is displayed.

4. The device according to claim 1, wherein the sub icon includes a plurality of sub icons, each of the sub icons corresponds to a process executable in the application associated with the superimposed second icon.

5. A method of controlling a device having a touch screen display, the method comprising:
displaying a lock screen on the touch screen display, the lock screen at least including a first icon not associated with any applications and a plurality of second icons each associated with an application;
while displaying the first icon and the plurality of second icons on the lock screen and without displaying a sub icon on the lock screen, in response to a detection of a gesture in which the first icon and one of the plurality of second icons are superimposed,
simultaneously displaying the first icon and a sub icon corresponding to the superimposed second icon, the sub icon corresponding to a process executable in the application associated with the superimposed second icon, wherein the first icon is moveable to be superimposed on the sub icon and the plurality of second icons; and when the first icon, the plurality of second icons, and the sub icon are simultaneously displayed on the lock screen, executing the process associated with the sub icon, in response to a gesture in which the first icon and the sub icon are superimposed, and executing an application among the applications and associated with a second icon among the plurality of second icons, in response to a gesture in which the first icon and the second icon are superimposed.

6. The method according to claim 5, further comprising displaying the lock screen including a first area in which the first icon is arranged and a second area, wherein the first and second areas are separated by a closed shape boundary, the first area is surrounded by the closed shape boundary, the closed shape boundary is surrounded by the second area, and each of the plurality of second icons is arranged on the closed shape boundary and extends into both the first and second areas.

7. A non-transitory storage medium storing therein a program for causing, when executed by a device having a touch screen display, the device to execute:

displaying a lock screen on the touch screen display, the lock screen at least including a first icon not associated with any applications and a plurality of second icons each associated with an application;

while displaying the first icon and the plurality of second icons on the lock screen and without displaying a sub icon on the lock screen, in response to a detection of a gesture in which the first icon and one of the plurality of second icons are superimposed, simultaneously displaying the first icon and a sub icon corresponding to the superimposed second icon but not displaying the superimposed second icon that is superimposed by the first icon, the sub icon corresponding to a process executable in the application associated with the superimposed second icon, wherein the first icon is moveable to be superimposed on the sub icon and remaining second icons other than the superimposed second icon; and when the first icon, the remaining second icons, and the sub icon are simultaneously displayed on the lock screen, executing the process associated with the sub icon, in response to a gesture in which the first icon and the sub icon are superimposed, and executing an application among the applications and associated with a second icon among the remaining second icons, in response to a gesture in which the first icon and the second icon among the remaining second icons are superimposed.

8. The non-transitory storage medium according to claim 7 storing therein the program for causing, when executed by the device having the touch screen display, the device to further execute:

displaying the lock screen including a first area in which the first icon is arranged and a second area, wherein the first and second areas are separated by a closed shape boundary, the first area is surrounded by the closed shape boundary, the closed shape boundary is surrounded by the second area, and each of the plurality of second icons is arranged on the closed shape boundary and extends into both the first and second areas.

* * * * *